United States Patent
Swenson

(10) Patent No.: US 8,491,290 B2
(45) Date of Patent: Jul. 23, 2013

(54) APPARATUS FOR PRODUCING NON-SYMMETRIC MULTIPLE LAYER INJECTION MOLDED PRODUCTS

(75) Inventor: Paul M. Swenson, South Hamilton, MA (US)

(73) Assignee: Kortec, Inc., Rowley, MA (US)

( * ) Notice: Subject to any disclaimer, the term of this patent is extended or adjusted under 35 U.S.C. 154(b) by 89 days.

(21) Appl. No.: 13/278,885

(22) Filed: Oct. 21, 2011

(65) Prior Publication Data

US 2013/0101696 A1    Apr. 25, 2013

(51) Int. Cl.
B29C 45/16    (2006.01)

(52) U.S. Cl.
USPC ............................................. 425/130; 425/572

(58) Field of Classification Search
USPC ........... 425/130, 572; 264/250, 328.8, 328.12
See application file for complete search history.

(56) References Cited

U.S. PATENT DOCUMENTS

| | | | |
|---|---|---|---|
| 2,418,856 A | 4/1947 | Stacey | |
| 3,339,240 A | 9/1967 | Corbett | |
| 3,679,119 A | 7/1972 | Copping | |
| 3,944,124 A | 3/1976 | Hexel | |
| 4,174,413 A | 11/1979 | Yasuike et al. | |
| 4,554,190 A | 11/1985 | McHenry et al. | |
| 4,568,261 A | 2/1986 | McHenry et al. | |
| 4,751,035 A | 6/1988 | McHenry et al. | |
| 4,946,365 A * | 8/1990 | Kudert et al. ................. | 425/130 |
| 4,990,301 A | 2/1991 | Krishnakumar et al. | |
| 5,433,910 A | 7/1995 | Mukai et al. | |
| 5,914,138 A | 6/1999 | Swenson | |
| 6,180,042 B1 | 1/2001 | Takeuchi et al. | |
| 6,787,097 B1 * | 9/2004 | Homann et al. ............... | 264/572 |
| 6,908,581 B2 * | 6/2005 | Sabin et al. ................ | 264/328.8 |
| 2002/0192404 A1 | 12/2002 | Swenson | |
| 2004/0265422 A1 | 12/2004 | Sabin et al. | |
| 2009/0152280 A1 | 6/2009 | Luburic | |
| 2009/0285929 A1 | 11/2009 | Diamantakos et al. | |
| 2010/0044916 A1 | 2/2010 | Richards et al. | |
| 2011/0217496 A1 | 9/2011 | Swenson | |

FOREIGN PATENT DOCUMENTS

| | | |
|---|---|---|
| EP | 0419829 A3 | 11/1991 |
| EP | 0419829 | 4/1998 |
| JP | 05084787 | 4/1993 |

(Continued)

OTHER PUBLICATIONS

U.S. Appl. No. 13/314,012, filed Dec. 7, 2011.

(Continued)

*Primary Examiner* — Tim Heitbrink
(74) *Attorney, Agent, or Firm* — McCarter & English, LLP

(57) ABSTRACT

A mold for molding an injection molded article comprises a mold cavity with a non-symmetrical portion. At least one flow leader in the non-symmetrical portion of the cavity produces a symmetrical flow boundary in a multilayer flow downstream of the non-symmetrical portion of the mold cavity. The at least one flow leader may be a variable thickness flow leader or may alternatively be a plurality of flow leaders having a flow path length that differs from the flow path length of an adjacent flow leader by no more than about 15%. The multilayer flow comprising an inner layer, an outer layer, and an interior layer. Co-injection molding apparatus and methods that may use the foregoing mold are disclosed. Similarly, co-injection molded articles and containers that may result from the foregoing mold, apparatus, and methods are disclosed.

42 Claims, 21 Drawing Sheets

FOREIGN PATENT DOCUMENTS

| | | |
|---|---|---|
| JP | 06190860 | 7/1994 |
| JP | 6278164 A | 10/1994 |
| WO | WO03/064133 | 8/2003 |
| WO | WO2005018909 | 3/2005 |
| WO | WO2007006163 | 1/2007 |

OTHER PUBLICATIONS

U.S. Appl. No. 13/314,718, filed Dec. 8, 2011.

F.A. Eigl et al., "Mehr Verständnis für den Kern," 86:1 Kunststoffe 46-50 (Carl Hanser Verlag, Munich) (Jan. 1, 1998) (German), translated as F.A. Eigl et al., "A Better Understanding of the Core," 88:1 Kunststoffe 14-16 (Jan. 1, 1998).

Naitove, Matthew H., "Multi-Layer Injection Molded Tubs Take on Thermoforming & Metal Cans," Plastics Technology, May 2011, (2 pages), available at http://www.ptonline.com/articles/multi-layer-injection-molded-tubs-take-on-thermoforming-metal-cans.

International Search Report and Written Opinion of the International Searching Authority for PCT/US2012/061057, dated Feb. 12, 2013, (17 pages).

\* cited by examiner

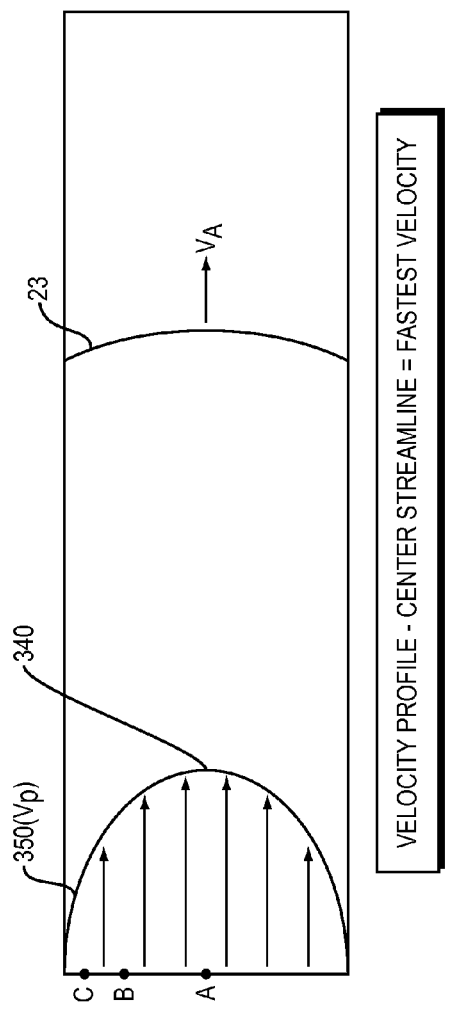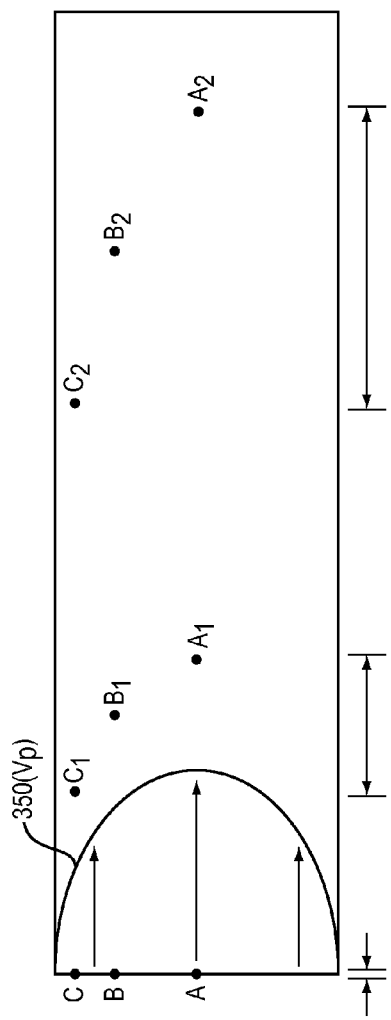

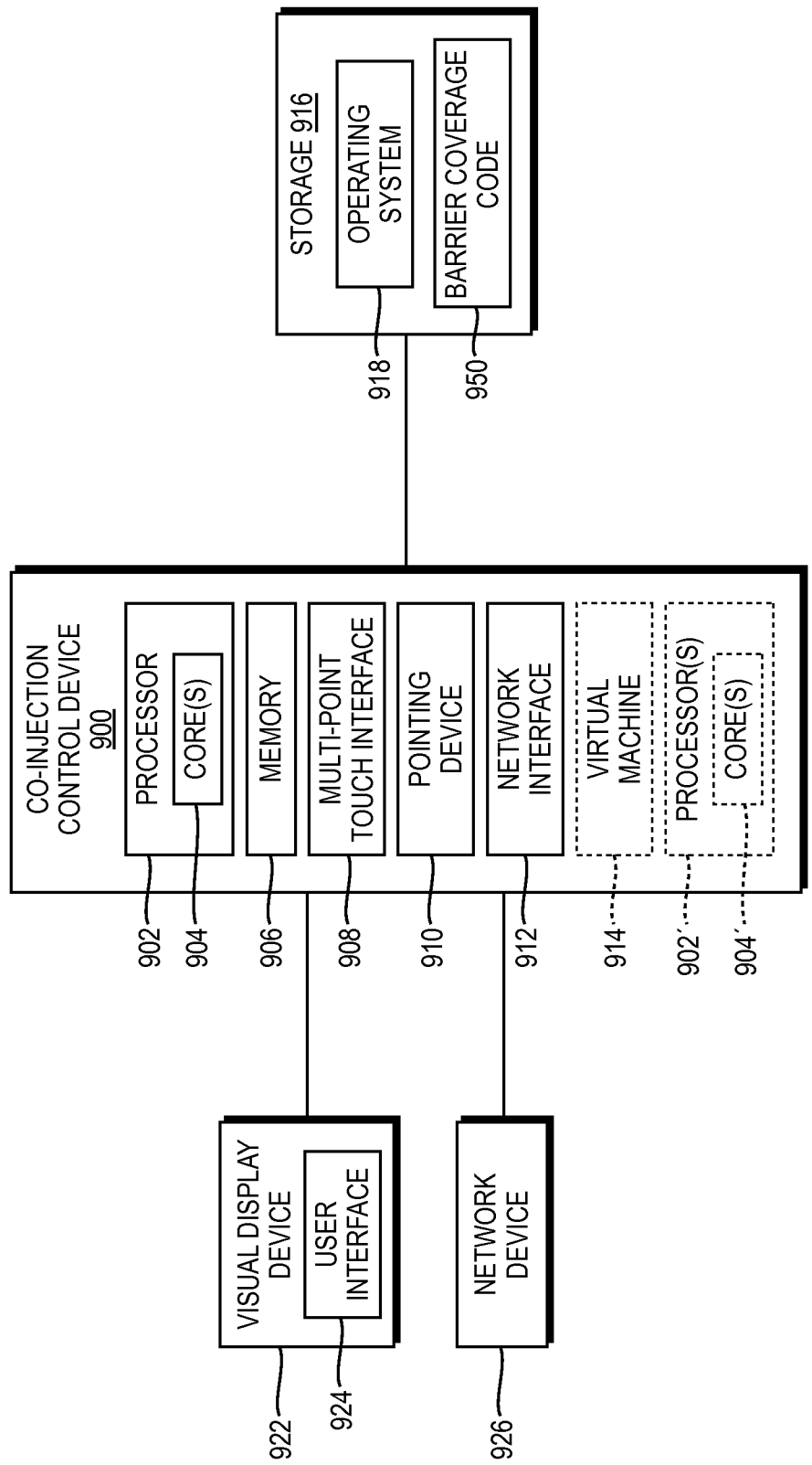

APPARATUS FOR PRODUCING NON-SYMMETRIC MULTIPLE LAYER INJECTION MOLDED PRODUCTS

FIELD OF THE INVENTION

Embodiments taught herein relate to multiple layer injection molded products. In particular, the embodiments relate to multiple layer products having non-symmetric configurations and an interior layer of a different material than other layers.

BACKGROUND INFORMATION

Injection molded articles are used for a variety of purposes. Plastic injection molded products are commonly made from materials such as polyethylene terephtholate (PET) or polypropylene (PP). In the case of articles 10 such as shown in FIG. 1 that have non-symmetric shapes (relative to the location of the injection gate 15), a flow leader 20, e.g., a local increase in thickness from the nominal part thickness, are used to compensate for the differences in mold flow lengths in different directions from the injection gate 15.

Plastic materials such as PET and PP are gas (e.g., oxygen, nitrogen, etc.) permeable. For applications in which gas permeability is undesirable, for example, food products, medicines and other substances and products that degrade upon gaseous exposure, a barrier material is co-injected with the plastic material. Typically, the barrier material, such as Ethyl Vinyl Alcohol (EVOH), is injected at the interior of the PET/PP material stream, forming an EVOH interior layer in the molded product.

The present inventor has attempted to form non-symmetric co-injection molded containers containing such an interior layer using known non-symmetric molding technologies, e.g., utilizing a flow leader, yet the resulting articles do not exhibit sufficient gas-impermeability. The inventor has found that when using conventional flow leader technologies, the interior layer does not sufficiently extend throughout the molded product to prevent detrimental gas permeation. Even when only small areas of the article do not contain the barrier material or a sufficiently thick barrier material, substantial permeation occurs.

SUMMARY OF THE INVENTION

Embodiments taught herein address the aforementioned disadvantages of known non-symmetric molding technologies including conventional flow leader technology. Exemplary molds and apparatus taught herein feature improved flow leader technology that can be used in a co-injection molding process to produce a non-symmetrical molded plastic article with superior coverage of its interior material layer. Exemplary molds, apparatus, methods, and non-transitory computer readable programs are taught herein to cause an interior core of material to flow in a manner that result in a non-symmetrical molded plastic article with barrier coverage extending between 95% and 100% of the entire surface area within a sealed or sealable portion of the article. The exemplary molds, apparatus, methods, and non-transitory computer readable programs taught herein are well suited for use in forming symmetrical molded plastic articles and asymmetrical molded plastic articles with barrier coverage extending between 99% and 100% of the entire surface area within the sealed or sealable portion of the article. Some exemplary articles include containers with an open end that may be sealed using a heat sealing methodology.

In one aspect, a mold for molding an injection molded article comprises a mold cavity with at least one flow leader in a non-symmetric portion of the mold cavity. The at least one flow leader may comprise a plurality of flow leaders defining different thicknesses and/or configurations in a non-symmetrical portion of the mold cavity. A multilayer flow comprises an inner layer, an outer, layer, and an interior layer. The at least one flow leader produces a symmetrical flow boundary in the multilayer flow downstream of the non-symmetrical portion of the cavity.

In another aspect, a co-injection molding apparatus comprises a mold and a first injection gate. The mold defining a mold cavity having at least one flow leader in a non-symmetrical portion thereof. The first injection gate is configured to co-inject at least one first and second flowable materials into the mold cavity and through the at least one flow leader. The at least one flow leader is configured to produces a symmetrical flow boundary downstream of the non-symmetric portion of the cavity. The apparatus thereby forms a molded article comprising the first and second flowable materials. The second flowable material is interior to the first flowable material in the article. Due to the at least one flow leader in the mold and the resulting symmetrical flow boundary, the apparatus may produce molded plastic articles with an interior layer embedded within greater than 95% of the entire surface area of the article. In the foregoing aspect, the apparatus may define 64 or more mold cavities.

In another aspect, a co-injection molding apparatus comprises a plurality of injection gates and a mold defining a mold cavity configured to form a molded article comprising a plurality of open containers. The mold cavity comprises a non-symmetrical portion that is non-symmetrical with respect to the plurality of injection gates and at least one flow leader in the non-symmetrical portion. The plurality of injection gates are configured for co-injection of a first flowable material and a second flowable material into the mold cavity and through the at least one flow leader to form the molded article with the first and second flowable materials. The second flowable material is interior to the first flowable material. The at least one flow leader is configured to produce a symmetrical flow boundary in the first and second flowable materials downstream of the non-symmetrical portion. In the foregoing aspect, the plurality of open containers may comprise 32 open containers, 64 open containers, an intermediate number of open containers between 32 and 64 open containers, or more than 64 open containers.

In another aspect, a method of molding a multiple layer article comprises injecting at least one first flowable material into a mold cavity configured to form a molded article from the at least one first flowable material. The mold cavity comprises a nonsymmetrical portion relative to an injection location of the at least one first flowable material. The method further comprises co-injecting at least one second flowable material into the mold cavity and interior to the at least one first flowable material. The method further comprises modifying the flow of the at least one first flowable material and the at least one second flowable material with at least one flow leader in the nonsymmetrical portion of the mold cavity to produce a symmetrical flow boundary downstream of the nonsymmetrical portion and cause the at least one second flowable material to flow throughout substantially the entire mold cavity.

In another aspect, a non-transitory computer readable medium holds computer executable instructions for molding a nonsymmetric multiple layer article. The medium includes instructions for injecting at least one first flowable material into a mold cavity configured to form a molded article from the at least one first flowable material. The mold cavity comprises a nonsymmetrical portion relative to an injection location of the at least one first flowable material and at least one flow leader in the non-symmetrical portion. The medium further includes instructions for co-injecting at least one second flowable material into the mold cavity and interior to the at least one first flowable material. The medium further includes instructions for delaying the co-injection of the at least one second flowable material into the mold cavity after the initial injection of the at least one first flowable material by a period of time calculated to produce, in the flow as modified by the at least one flow leader, a symmetrical flow boundary downstream of the nonsymmetrical portion and to cause the at least one second flowable material to flow throughout substantially the entire mold cavity.

In any of the foregoing aspect, the at least one injection gate may be adjacent to, or remote from, the nonsymmetric portion of the mold cavity.

In any of the foregoing aspects, the at least one flow leader in a non-symmetric portion of the mold cavity may comprise a variable thickness flow leader. The variable thickness flow leader may feature a first thickness along a first flow path and a second thickness along a second flow path. The variable thickness flow leader may further feather a smooth transition from the first thickness to the second thickness. The transition may be measured at a single distance from the injection location. Alternatively, the transition may be measured along a first line that is perpendicular to a second line that intersects the injection location. In any of the foregoing aspects, the flow leaders may be configured so that flow fronts of molding material injected into the flow leaders exit the distal ends of the first and second flow paths at substantially the same time.

In any of the foregoing aspects, the at least one flow leader may comprise a plurality of flow leaders defining different thicknesses and/or configurations in a non-symmetric portion of the mold cavity. The plurality of flow leaders in the non-symmetrical portion of any of the foregoing aspects may have a flow path length that differs from the flow path length of adjacent flow leaders by no more than about 15 percent, no more than about 5 percent, or no more than about an intermediate percentage. In any of the foregoing aspects, the flow leaders may be configured so that flow fronts of molding material injected into the flow leaders exit the distal ends of the flow leaders substantially simultaneously. In any of the foregoing aspects, the flow leaders may be configured so that flow fronts of molding material exit the distal ends of the flow leaders at substantially the same flow rate.

In any of the foregoing aspects, the at least one flow leader may be configured so that the velocity of the leading edge of the interior layer exiting the distal end of the at least one flow leader is substantially equal to, and/or greater than, the product of the velocity of the combined flow front multiplied by the quotient of the flow distance from the leading edge of the interior layer to the periphery of the mold divided by the flow distance from the combined flow front to the periphery of the mold. In any of the foregoing aspects, the at least one flow leader in the non-symmetrical portion of the mold cavity may be configured to produce a symmetrical flow boundary downstream. The flow leader may be configured to produce a uniform or non-uniform symmetrical flow boundary.

In any of the foregoing aspects, the combined flow of the first material and the second material may be modified in a non-symmetric portion of the mold cavity by at least one flow leader. In any of the foregoing aspects, the start of the flow of the second material may be delayed by a time period after the start of the flow of the first material. The time period of the delay may be calculated to produce, in the flow as modified by the at least one flow leader, a symmetrical flow boundary downstream and to cause the second material to flow throughout substantially the entire mold cavity.

In another aspect, a multiple layer injection molded article comprises at least one first material generally defining the configuration of the molded article. The molded article includes a non-symmetric portion relative to an injection location of the first material during injection molding. The injection molded article further comprises at least one second material substantially contained within the at least one first material and extending throughout more than 95% of the entire molded article. The length of a path in the non-symmetric portion of the molded article along which the at least one first and the at least one second materials flowed to form the molded article differs from a length of any adjacent path by no more than about 15%.

In another aspect, a multiple layer injection molded article comprises at least one first material and at least one second material. The at least one first material generally defines a configuration of the molded article. The molded article includes a non-symmetric portion relative to an injection location of the first material during injection molding thereof. The at least one second material is substantially contained within the at least one first material and extends throughout more than 95 percent of the entire molded article. The non-symmetric portion of the molded article features a first thickness with respect to a first path and a second thickness with respect to a second path along which the at least one first and the at least one second materials flowed to form the molded article. The non-symmetric portion of the molded article features a smooth transition from the first thickness to the second thickness.

In another aspect, a multiple layer molded container comprises a closed end defining a periphery thereof and at least one wall extending from the periphery of the closed end. The at least one wall defines a container sidewall extending completely around the periphery of the closed end and further defining an open end of the container opposite the closed end. The closed end and sidewall are formed of first and second materials co-injected at an injection location on the closed end and generally defining a configuration of the closed end and the sidewall. The second material is substantially contained within the first material. The closed end is nonsymmetrical relative to the injection location. The open end is enclosable by a substantially gas impermeable closure to sealingly enclose the container. A length of a path in a non-symmetric portion of the closed end along which the first and second materials flowed to form the molded container differs from a length of any adjacent path by no more than 15 percent. When the container is sealed by the closure, the oxygen permeation into the enclosed contained is less than about 0.05 ppm per day.

In another aspect, a multiple layer molded container comprises a closed end defining a periphery thereof and at least one wall extending from the periphery of the closed end. The at least one wall defines a container sidewall extending completely around the periphery of the closed end and further defines an open end of the container opposite the closed end. The closed end and the sidewall are formed of first and second materials co-injected at an injection location on the closed end and generally define a configuration of the closed end and the sidewall. The second material is substantially contained within the first material. The closed end is nonsymmetrical relative to the injection location. The open end is enclosable by a substantially gas impermeable closure to sealingly enclose the container. The non-symmetric portion of the closed end features a first thickness with respect to a first path and a second thickness with respect to a second path along which the first and second materials flowed to form the container. The non-symmetric portion of the closed end features a smooth transition from the first thickness to the second thickness. When the container is sealed by said closure, oxygen permeation into the enclosed container is less than about 0.05 ppm/day.

Portions of any of the foregoing molded articles or containers may correspond to the at least one flow leader(s) described above. In any of the foregoing molded articles or containers, the second material may be folded over within the first material. When any of the foregoing containers is sealed by said closure, oxygen permeation into the enclosed container may be less than about 0.005 ppm/day.

In any of the foregoing aspects, the first material that forms the inner and outer layers may be a different material than the second material that forms the interior layer. In any of the foregoing aspects, the first material that forms the inner and outer layer(s) may be a plastic material suitable for injection molding, such as polyethylene or polypropylene. In any of the foregoing aspects, the second material may be substantially contained or embedded with the inner and outer layers. In any of the foregoing aspects, the second material may be a material that is relatively more oxygen impermeable than the first material. In any of the foregoing aspects, the second material may be a material and/or compositions exhibiting increased impermeability of gas, light, UV radiation, and/or electromagnetic waves relative to first material that forms the inner and outer layer. In any of the foregoing aspects, the second material may include ethyl vinyl alcohol, nylon, an oxygen scavenging material, and/or a desiccant. In any of the foregoing aspects, the interior layer of a co-molded article having a non-symmetrical portion may extend throughout (e.g., between) the inner and outer layers to a greater degree than previously known articles. In any of the foregoing aspects, the first material and/or the second material may contain an adhesive.

Exemplary computerized systems, methods and non-transitory computer readable storage mediums taught herein are configured and adapted to cause the interior core of material to flow in a manner that results in an asymmetric molded plastic article with barrier coverage embedded within greater than 95% of the entire permeation exposed surface area, for example, within the sealed or sealable portion of the article. The computerized systems, methods and non-transitory computer readable storage mediums taught herein may further be configured and adapted to cause the interior core of material to flow in a manner that results in an asymmetric molded plastic article with barrier coverage embedded within greater than 95% of the entire permeation exposed surface area. In some embodiments, computer readable storage mediums holding computer executable instructions are taught. Execution of the instructions by a processor controls formation of a co-molded multiple layer article as taught herein. Execution of the instructions by the processor controls or causes injection of an interior layer material into a combined material flow in an asymmetric mold cavity having multiple flow leaders that may have different thicknesses and configurations. The interior layer material forms a barrier layer or a scavenger layer in the resulting multiple layer molded article. The exemplary instructions when executed by the processor form the resulting multiple layer molded article with high barrier coverage.

Other objects and advantages of the present invention will become apparent in view of the following detailed description of the embodiments and the accompanying drawings.

BRIEF DESCRIPTION OF THE DRAWINGS

FIGS. 16A and 16B are cross-sectional views of the velocity profile of the combined annular flow of the polymeric stream and the relative velocity differences across the flow gradient of the combined polymeric stream.

FIG. 23 illustrates an exemplary computing environment suitable for practicing exemplary embodiments taught herein.

DETAILED DESCRIPTION

Figure 2:
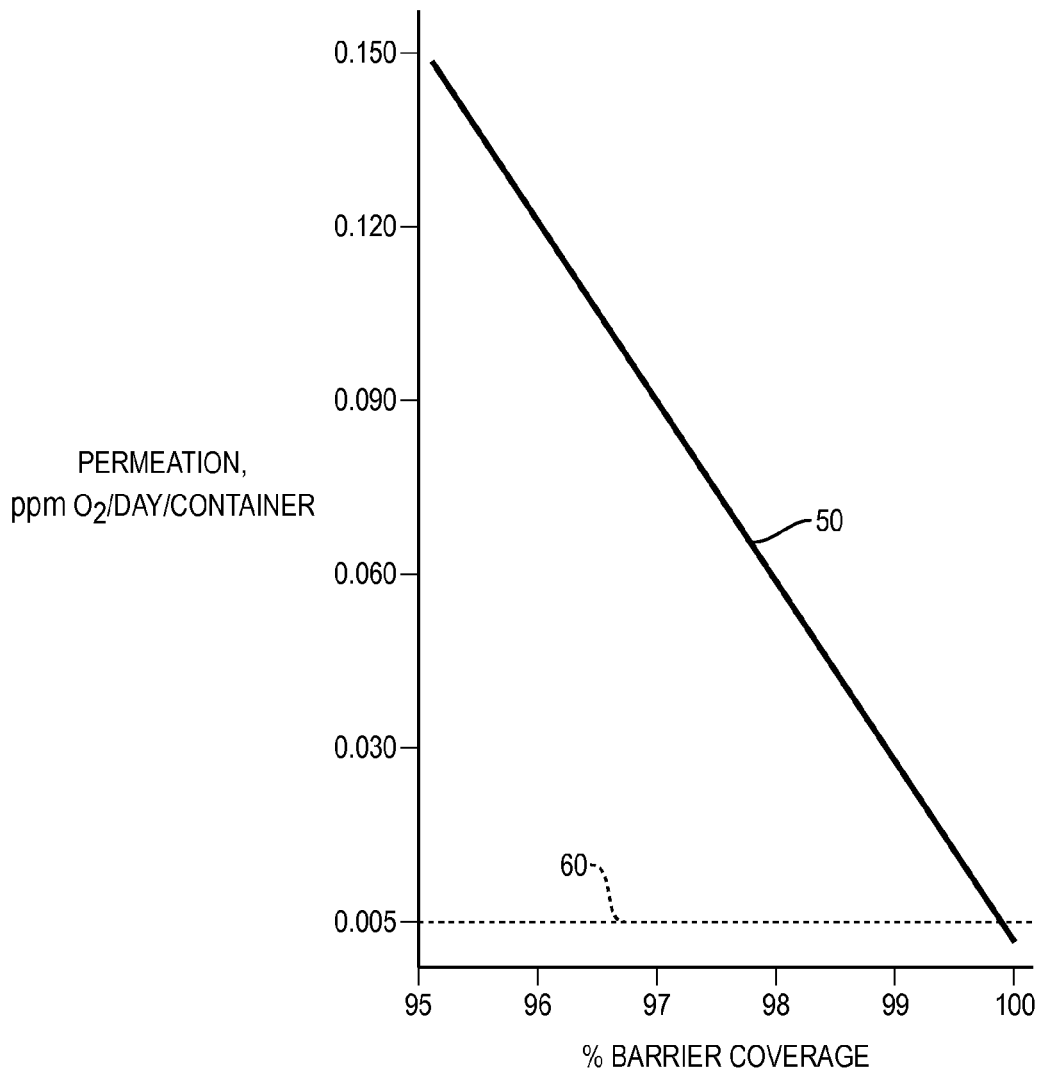
FIG. 2 is a schematic graph showing oxygen permeation as a function of barrier coverage.

FIG. 2 schematically illustrates an oxygen permeation curve 50 representing oxygen permeation through the walls of a plastic co-injection molded product as a function of coverage of an inner barrier relative to the total exposed wall surface area of the sealed portion of the product. FIG. 2 also illustrates a target permeation rate 60 representing an optimal permeation to prevent undesirable degradation of the substance inside the sealed container. The interior layer materials associated with the FIG. 2 graph may consist of Ethyl Vinyl Alcohol (EVOH), MXD6 nylon or other passive barrier materials; EVOH, MXD6 nylon or other barrier materials, any of which has an oxygen scavenging component; or EVOH, MXD6 nylon or other barrier materials, any of which has a desiccant component. As can be seen in FIG. 2, more than 99% coverage is required to achieve the target permeation rate 60, which, in the illustrated embodiment, is 0.005 ppm $O_2$/day/container (ppm calculated on the basis of liquid content of the container). Though the target permeation rate 60 may depend upon the particular substance in the container, the container configuration, and desired storage life (as total permeation is a function of both rate, exposed area, and time), the inventor considers the depicted target permeation rate 60 to be typical of food-containing articles. Further, while permeation rate is also dependent upon exposure conditions and to some extent, the wall thickness of the container, one skilled in the food storage arts would consider the permeation curve 50 to be typical of food containers under typical, if not favorable, storage conditions. Expected variations in the test parameters produced comparable results.

Depending on the food and the desired storage time (shelf life), the target permeation rate 60 may be an order of magnitude higher or lower than 0.005 ppm $O_2$/day/container, i.e., 0.05 or 0.0005 ppm $O_2$/day/container. The slope of the permeation curve 50 differs with different types and thicknesses of interior layer materials, but one skilled in the art will appreciate that a significant increase in the permeation rate occurs with each 1% decrease in the barrier coverage of the container surface area.

Figure 3A:
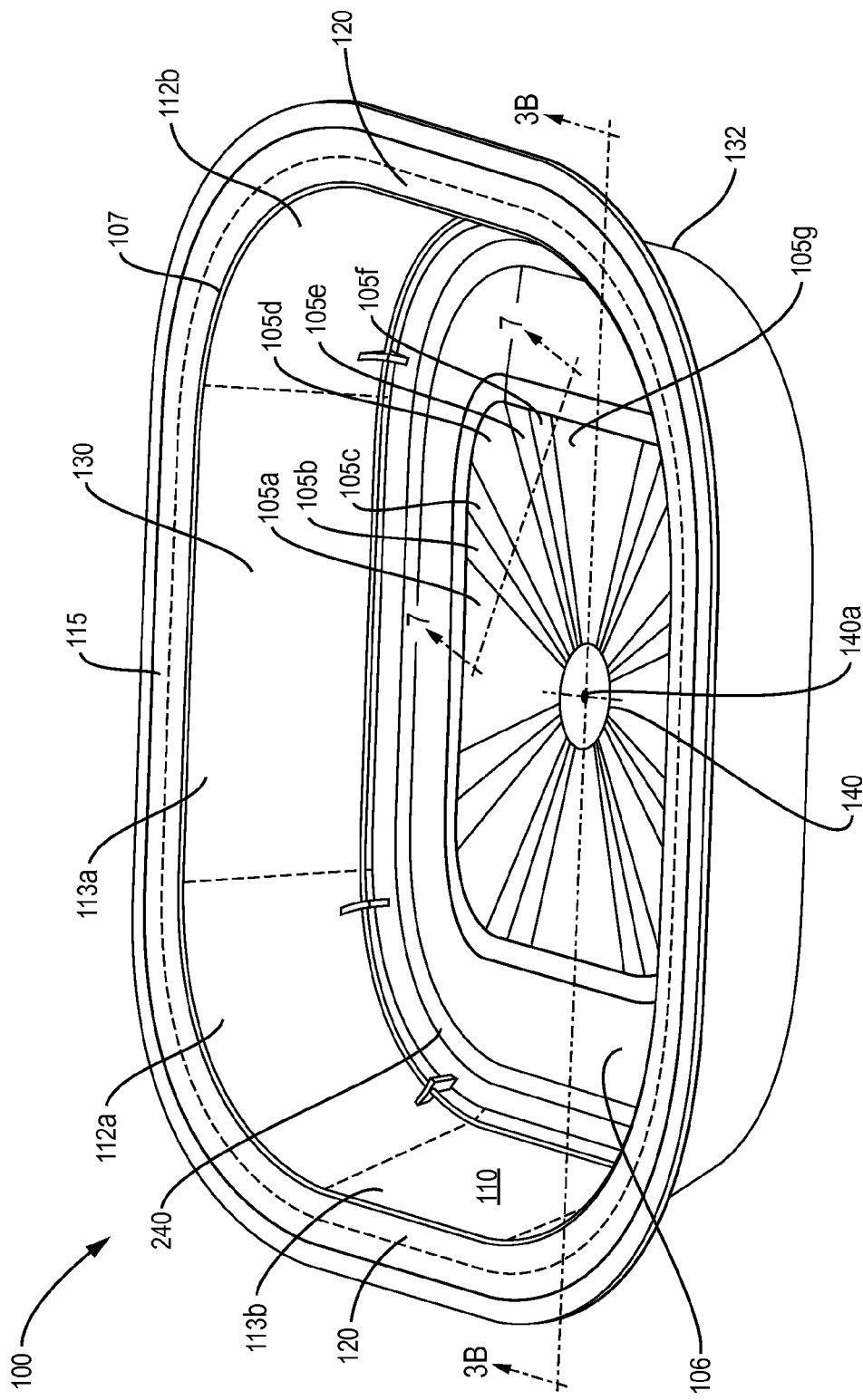
FIG. 3A is a perspective view of a container according to an embodiment as taught herein.

FIG. 3A depicts a container 100 that achieves the target permeation rate according to embodiments taught herein. The container 100 has a bottom 105, a sidewall 110 extending from the periphery of the bottom 105 to form a chamber 106, in this embodiment generally cup-shaped or U-shaped, having an open end 107, and a flange 115 extending from the periphery of the sidewall 110 at the open end 107 of the container. In the illustrated embodiment, the sidewall 110 has four radiused corner portions 112 and four straight portions 113 extending between the corner portions 112. FIG. 3A illustrates corner portions 112a and 112b and straight portions 113a and 113b. However, the container 100 may be configured as desired for its intended use, having dimensions and structural integrity adequate for this purpose, e.g., contain the desired substance. Those skilled in the art will understand how to achieve this.

The container 100 may further include a sealing zone 120 with a sealable surface. In the embodiment illustrated in FIG. 3A, the sealing zone 120 and its surface are formed in the flange 115 and extend circumferentially about the flange 115. The surface of the sealing zone 120 may extend circumferentially throughout substantially the entire flange 115. In the embodiment in FIG. 3A, however, the surface of the sealing zone 120 encompasses only an inner portion of flange 115. The sealing zone 120 and its surface may be used to engage a removable or unremovable closure (not shown), such as a top or lid, to partially or completely enclose the open end 107 of the chamber 106. The closure itself may be substantially gas impermeable. In this manner, the open end 107 of the chamber 106 can be enclosed to both maintain the contents of the container, e.g., keep fluid substance in the container, and prevent undesirable gas permeation.

The container 100 may be formed by injecting a plastic material, such as, for example, PET or PP, into a mold cavity so as to form an inner layer 130 and outer layer 132, which together generally conform to the desired end shape of the container or product, accounting for manufacturing requirements (e.g., thermal expansion/contraction) as is known. Despite being termed herein an "inner" or "outer" layer, and in the illustrated embodiment the inner layer 130 and the outer layer 132 form the inside and outside of the container, respectively, it is not intended that those terms be limited in that manner. Rather, the terms merely refer to the portions of the plastic material that form the wall or "skin" of the molded product. The outer layer 132 and inner layer 130 material(s) are injected through an injection gate at location 140, as is known to those in the art. Though PET and PP are commonly used materials, it should be understood that other suitable materials may be used, such as high-density polyethylene (HDPE) or polycarbonates (PC), and that various embodiments can use other polymeric materials.

Figure 3B:
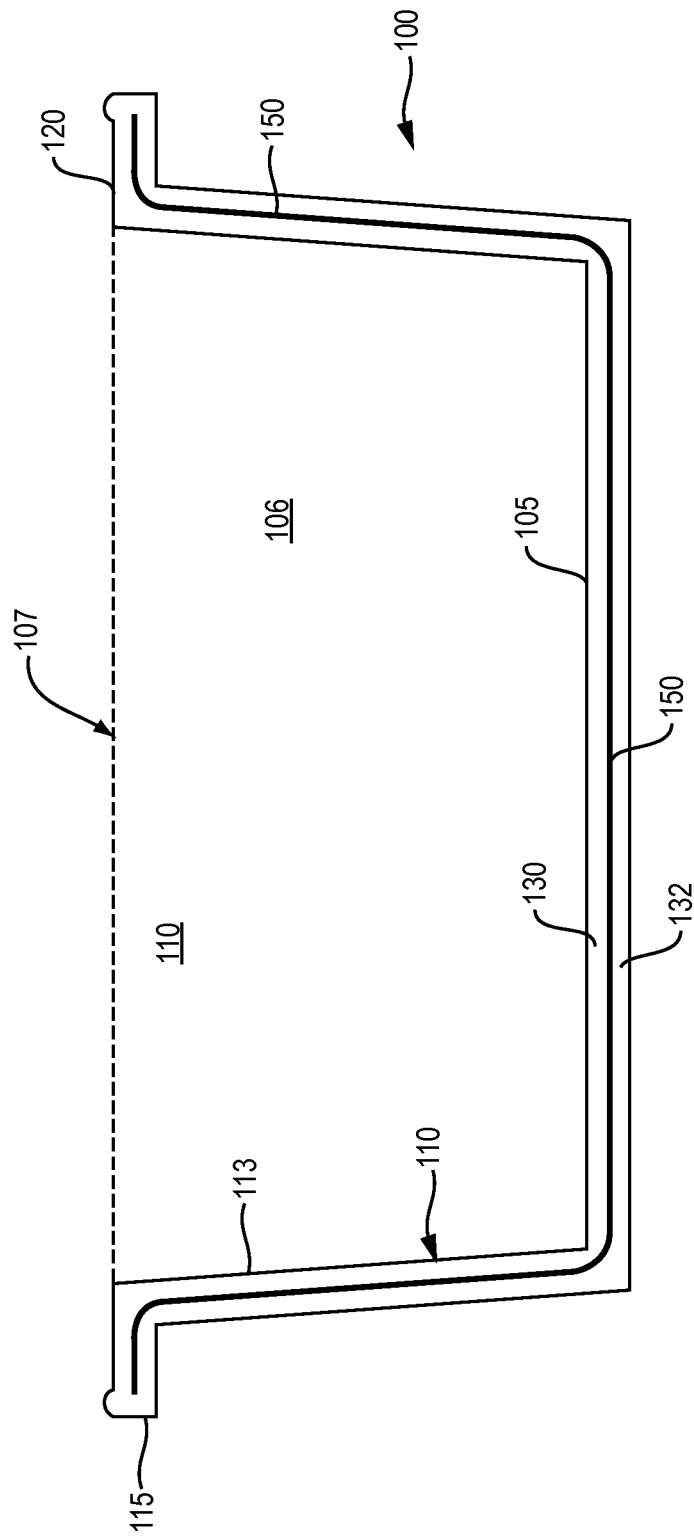
FIG. 3B is a schematic cross-sectional view of the container of FIG. 3A along the indicated line, but with the wall thickness of the container exaggerated for illustrative purposes.

FIG. 3B shows a cross-section of the container 100 of FIG. 3A along the line indicated in FIG. 3A. However, in FIG. 3B, the wall thickness of the container has been exaggerated so as to illustrate the structure. As can be seen in FIG. 3B, the container 100 has an interior core layer 150 extending substantially entirely throughout the container, but is substantially fully surrounded by the outer layer 132 and inner layer 130. The interior layer 150 is a barrier material, such as EVOH, nylon, MXD6 nylon, an oxygen scavenging material, a desiccant, or other suitable materials that are known or may become known, that sufficiently prevents gases, for example, oxygen, from permeating through the container, i.e., from the outside to the inside and vice versa. Similarly, the barrier material of layer 150 may prevent light, UV radiation, and/or electromagnetic waves from permeating through the container. In embodiments with low target gas permeation rates, e.g., containers for highly oxygen sensitive foods or other materials, the interior layer 150 may extend along about 99% or more of the exposed surfaces of the container 100. In some embodiments, the exposed surfaces are those surfaces defined to be within a periphery of a sealing area 120. The sealing area 120 is an outer surface, zone, or region to which a seal contacts to seal the open end 107 of the container. In some embodiments, the exposed surfaces are those surfaces defined to extend beyond a periphery of a seal contact surface 120.

As shown in FIG. 2, this high coverage by interior layer 150 dramatically reduces the gas permeation during typical expected exposure conditions as compared to coverage below 99%. As can be seen in the particular embodiment of FIG. 3B, the interior layer 150 extends into the flange 115. In this embodiment, though, as the flange, and thus portion of the interior layer 150 in the flange is at an angle to the sidewall 110 of the container, in this case nearly a right angle, the portion of the interior layer 150 in the flange does not significantly contribute to the coverage with respect to the exposed area of the container. In other embodiments, depending on the configuration of the container and the flange, the desired degree of coverage, including high degrees of coverage (e.g., 99% or more), may be obtained without the interior layer 150 extending into the flange 115 or significantly into the flange 115. Yet other embodiments may have a flange configuration wherein the flange (or portion thereof) may present an exposed area through which gas can permeate into or out of the chamber 106. In such embodiments, the interior layer 150 may extend into the flange 115 to provide the desired degree of coverage. Moreover, in embodiments where the open end 107 is sealed by a lid or closure, e.g., a heat seal, the interior layer 150 may not need to extend past the seal to provide an adequate permeation barrier.

Figure 4:
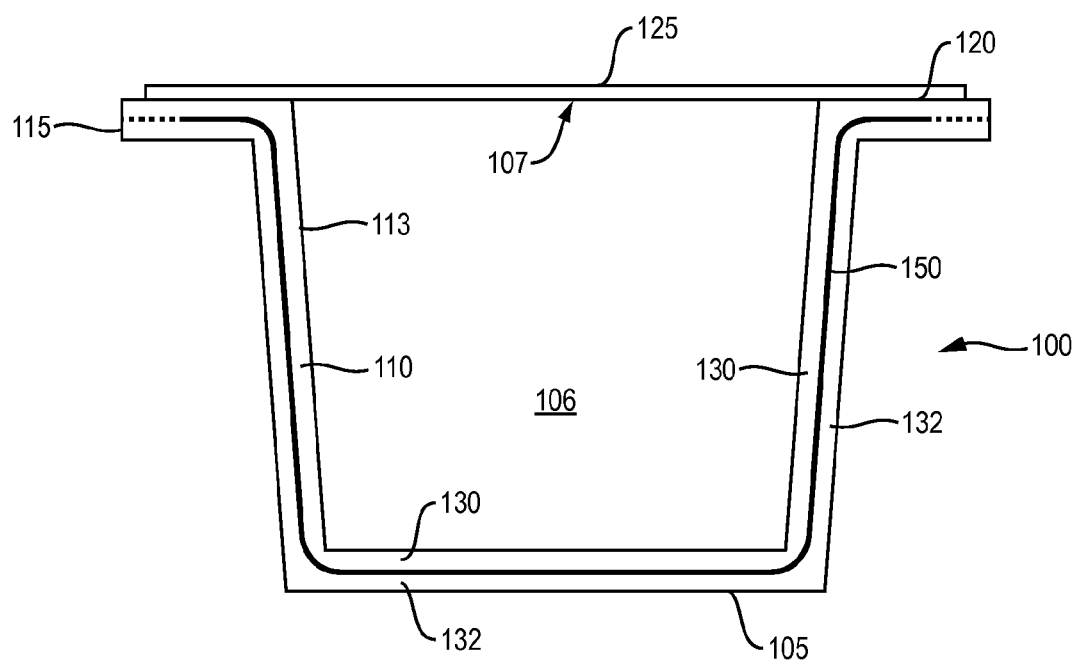
FIG. 4 is a schematic cross-sectional view of another container according to an embodiment as taught herein.

By way of example, FIG. 4 depicts another embodiment of a container 100 that has a closure 125 closing the open end 107 of the chamber 106. The closure 125 itself is typically substantially gas impermeable, e.g., via the foil material. For example, a commonly known and used lid for use with food containers is a heat-sealed lid. Such lids may comprise a foil layer, e.g., aluminum foil, with a plastic layer coating on at least a portion of the foil layer that contacts the flange 115 within the surface area of sealing zone 120. The plastic layer is typically the same (or similar) material as the container 100. The closure 125 may be sealed to the flange 115 at the seal contact surface 120 by conventional methods, such as by heat-sealing, crimping, and other known methods. Conventional sealing processes often involves heat and compression, which sufficiently softens and/or melts the plastic layer and/ or adjacent flange 115 material to seal the closure to the surface area of the sealing zone 120.

As may be noted, the interior layer 150 does not extend to the end of the flange. However, those of ordinary skill in the art should appreciate that the exposed portion of the flange that does not contain the interior layer is an extremely small portion of overall exposed surface area of the container 100 (the thickness of the flange 115 in FIG. 4 being greatly exaggerated for illustration purposes). Thus, the desired degree of coverage, including high degrees of coverage (e.g., 99% or more), may be obtained without the interior layer 150 extending to the outer periphery of the flange 115, although in some embodiments the interior layer may extend to the outer periphery of the flange 115. Put another way, the degree of coverage is most relevant to the sealed or sealable portion of the container 100 that is within the location where the closure 125 is sealed to the container, e.g., the seal contact surface 120. If an adequate degree of coverage is achieved within the area defined by the outer bounds of the seal contact surface, zone or region e.g., 99% coverage within the seal contact surface, desired permeation rates may be achieved. In the illustrated embodiment, for example, the interior layer 150 extends to or beyond the margin of the seal contact surface (in this container configuration the radially inward margin), and adequate coverage is obtained without the interior layer extending beyond that point. Nonetheless, embodiments also may be utilized to provide the interior layer 150 to or nearly to the end of flange, beyond the seal contact surface margin, as depicted in dashed lines in FIG. 2.

Though the illustrative embodiment has a cup-like shape, the invention contemplates containers having alternative shapes or configurations in which the sealing zone 120 can be used to seal a portion of the container, which should be appreciated by those in the art. For example, if sidewall 110 had a lip, the lip could alternatively include the sealing zone and its surface. Further, though the embodiment of FIG. 4 has an open end 107 that may be closed by a closure 125, alternative embodiments with different open ends are contemplated. In the embodiment of FIG. 4, the surface area of the sealable portion of the molded article comprises the surface area of the base 105, the surface area of the sidewall 110, and the surface area of the portion of the flange 115 extending radially under the sealing zone 120 of the closure 125. The surface area of the sealable portion of alternative molded articles may be defined differently depending on their shapes or configurations and where they are sealed or intended to be sealed. For example, the surface area of the sealable portion of alternative container embodiments may not extend to a flange, but may instead, for example, extend only to the sealing zone in a lip of the sidewall.

Figure 5A:
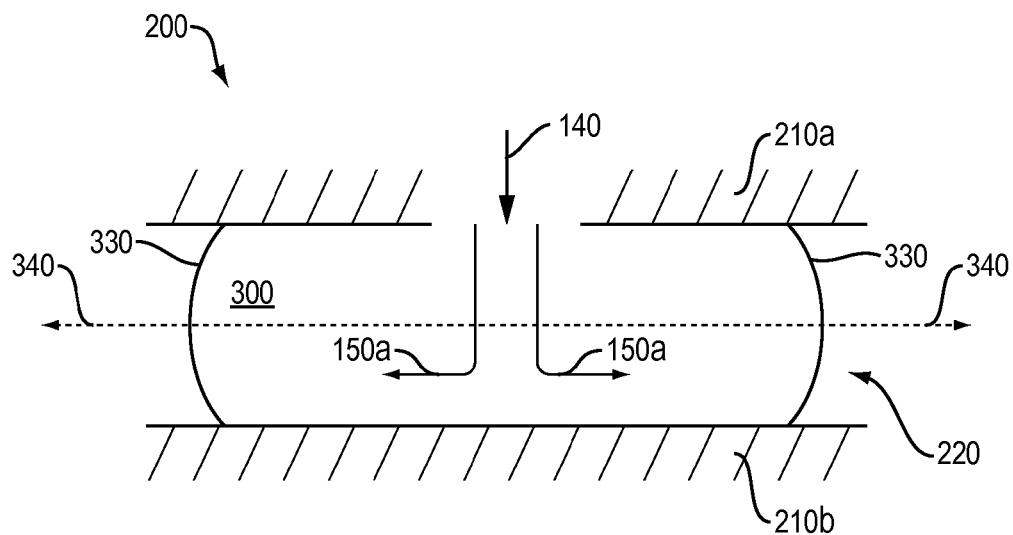
FIG. 5A is schematic cross-sectional view of an exemplary material flow in a co-injection molding system according to an embodiment as taught herein.

As shown schematically in FIG. 5A, a mold 200 has mold portions 210a, 210b that form a mold cavity 220 therebetween. Material is injected from a nozzle assembly through an injection gate at gate injection location 140 and into the mold cavity 220. The nozzle assembly forms the combined flow 300 from the inner material, the outer material, and the interior material. The combined flow 300, which in certain configurations may be an annular flow, flows from the injection location 140 through the mold cavity 220. The inner material forms an inner flow, the interior material forms an interior flow 150a, and the outer material forms an outer flow of the combined flow 300. The combined flow 300 forms a flow front 330 that moves through the mold cavity 220. At certain times, the combined flow 300 may consist of two materials (inner and outer) or three materials (inner, outer, and interior).

An interior material flow is indicated in FIG. 5A as 150a. An interior layer 150 may be created in a molded article by simultaneously injecting the interior layer material 150 into the interior of the material stream of the outer layer 132 and inner layer 130. Such methods are generally known, such as described in U.S. Pat. No. 6,908,581 and the documents incorporated therein, also incorporated by reference herein in their entirety.

Figure 5B:
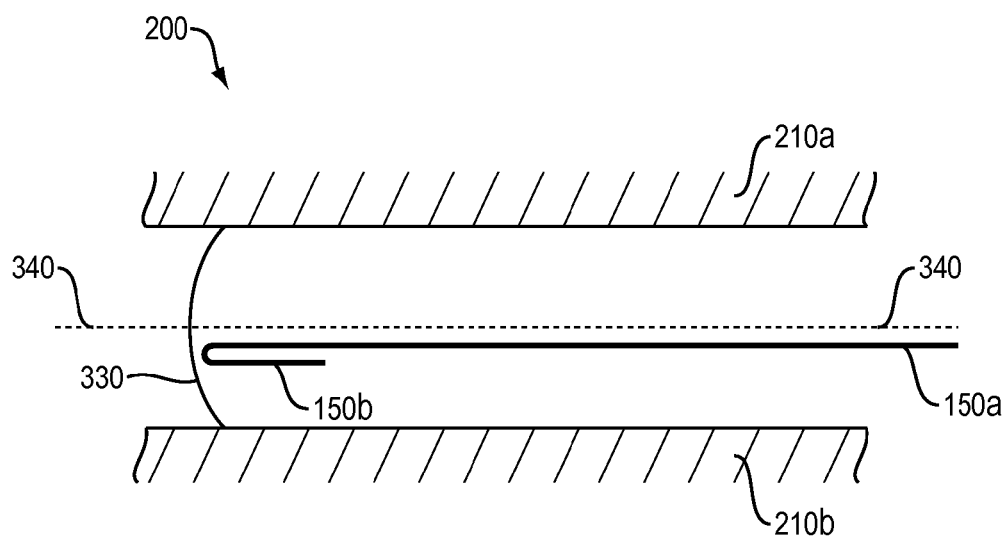
FIG. 5B is a schematic cross-sectional view of an exemplary material flow according to various embodiments taught herein.

Similar to FIG. 5A, FIG. 5B schematically shows a mold 200 having mold portions 210a, 210b that form a mold cavity 220 therebetween. As discussed in further detail below, the volumetric flow volume ratio of the inner flow to the outer flow forming the combined flow 300 may be selected to cause the interior layer flow stream to flow along a streamline offset from the zero velocity gradient 340 ($V_{max}$) of the combined flow 300, yet on a streamline having a greater velocity than the average flow velocity ($V_{ave}$) of the combined flow 300. This prevents the interior layer material flow 150a from breaking through the flow front 330. Rather, as shown in FIG. 5B, when the leading edge of the interior layer becomes proximate to the combined stream flow front 330, the interior layer material flow 150a folds over to form a foldover portion 150b behind the flow front 330 and remains encased by the inner and outer flows of the combined flow 300. By starting the interior layer material flow 150a offset from the zero velocity gradient, the interior layer can "catch up" to the flow front forming a fountain flow and fold over. This forms a barrier or scavenger layer that can extend through and provide barrier or scavenger protection over a range of between 99% and 100% coverage through out the resulting molded plastic article. The interior layer may be located either inside or outside the location of the zero-velocity gradient creating fold over toward the inside or outside of the part, respectively.

Referring back to FIG. 3A, the bottom 105 of the container is not symmetric around the injection gate location 140a. That is, the distance between the injection gate location 140a and the periphery of the bottom 105 varies around the periphery of the bottom 105. In this embodiment, this distance is at a minimum along a flow path from the injection gate location 140a perpendicular to sidewall straight portions 113a, increases to a maximum along a flow path perpendicular to the sidewall corner portions 112, and decreases to another minima along the flow path perpendicular to sidewall straight portions 113b. In the embodiment of FIG. 3A, as the container 100 has a generally rectangular shape, the flow path length from the injection location 140a perpendicular to the sidewall straight portions 113b is greater than the flow path length from the injection location 140a perpendicular to the sidewall straight portions 113a. However, those in the art will understand that any non-axially symmetric shape will result in different flow path lengths.

In order to compensate for the different path lengths, it is known to utilize a mold cavity having a flow leader that consists of a portion of the mold cavity with a uniform greater thickness, generally extending in the directions of the longer flow paths. However, the inventor has found that while using such a flow leader is adequate for producing a single-layer (single material) article, it not does not produce a multiple layer (multiple material) article with sufficient coverage by the interior layer to prevent undesirable gas permeation. The inventor theorizes that even using such a flow leader, outer layer material flows transversely to the overall flow direction, impeding the flow of interior layer material and preventing adequate formation of the interior layer. Thus, while known flow leader techniques adequately compensate the overall flow of the outer layer material (as in the case of a mono-material molding), these techniques are inadequate when also using an interior layer material in co-injection molding.

The inventor has discovered that a multiple layer article having an interior layer providing adequate coverage may be molded by using at least one flow leader in a nonsymmetric portion of a mold cavity designed to produce a particular effect on the flow. As used herein with respect to the invention, the term "flow leader" means a wall portion having a thickness different than the nominal design thickness of the mold cavity, which is designed to preferentially alter the flow through the mold cavity. In some embodiments, a flow leader as taught herein includes a wall portion having a varying wall thickness. In some embodiments, a flow leader as taught herein includes a wall portion having multiple segments of varying wall thickness. In some embodiments, there may be a relatively smooth transition from a first wall thickness to a thicker or thinner second wall thickness, for example, a tapered or ramped transition. In some embodiments, there may be a relatively abrupt transition from a first wall thickness to a thicker or thinner second wall thickness, for example, a step transition.

The variable thickness of a flow leader may be selected so that material injected into the mold cavity (including both the outer and inner layer material and the interior layer material) and passing through the flow leader in the non-symmetric portion of the mold cavity will form a flow boundary downstream of which certain conditions are met. By using a variable thickness flow leader, material flow may be more closely controlled and coordinated throughout the mold cavity, permitting improved and more uniform flow of the interior layer material, forming a more complete interior layer. Additionally or alternatively, the thicknesses of each of a plurality of flow leaders may be selected so that material injected into the mold cavity (including both the outer and inner layer material and the interior layer material) and passing through the plurality of flow leaders in the non-symmetric portion of the mold cavity will form a flow boundary downstream of which certain conditions are met. For example, downstream of the flow boundary, the inner and outer layer material and the interior layer material may reach the periphery of the mold cavity at substantially the same time and, desirably, at substantially the same flow rate (e.g., velocity). Various embodiments may thus provide co-injected articles with increased interior layer coverage than using previously known flow leader techniques. Embodiments may provide high coverage articles, e.g., with more than about 99% interior layer coverage.

The thickness of at least one flow leader in a non-symmetric portion of the mold cavity may be selected so that material injected into the mold cavity, passing through the at least one flow leader, and existing the distal end of the flow leader will form a symmetrical flow boundary downstream in the mold cavity. Similarly, the thickness of each of a plurality of flow leaders in a non-symmetric portion of the mold cavity may be selected so that material injected into the mold cavity, passing through the plurality of flow leaders, and existing the distal end of the flow leaders will form a symmetrical flow boundary downstream in the mold cavity. The material passing though the symmetrical flow boundary may reach the periphery of the mold cavity at substantially the same time and, desirably, at substantially the same flow rate (e.g., velocity). By using multiple flow leaders, material flow may be more closely controlled and coordinated throughout the mold cavity, permitting improved flow of the interior layer material, so that a more complete interior layer is formed. Various embodiments may thus provide co-injected articles with increased interior layer coverage than using previously known flow leader techniques. Embodiments may provide high coverage articles, e.g., with more than about 99% interior layer coverage.

The single or multiple flow leaders as taught herein may be configured to produce a symmetrical flow boundary downstream. As used with respect to the claims and embodiments taught herein, the term "symmetrical flow boundary" means a boundary downstream of which the velocity of the combined flow front ($V_F$) is substantially perpendicular to the periphery of the mold and the velocity of the leading edge of the interior layer ($V_I$) is substantially equal to, and/or greater than, the product of the velocity of the combined flow front multiplied by the quotient of the flow distance from the leading edge of the interior layer to the periphery of the mold divided by the flow distance from the combined flow front to the periphery of the mold ($V_F*(L_I/L_F)$).

For multilayer flow in accordance with embodiments taught herein, one or more flow leaders in a non-symmetrical portion of a mold cavity would ideally be configured to produce a flow boundary in the mold cavity downstream of which (1) the velocity of the combined flow is effectively perpendicular to the periphery of the mold cavity so that the velocity vector has no significant tangential component, and (2) the velocity of the leading edge of the interior layer is uniformly proportional to the velocity of the combined stream flow front around the periphery of the mold cavity, such that the leading edge of the interior layer reaches the desired position proximate to the periphery of the cavity along the entire periphery. This flow boundary is a first example of symmetrical flow boundary. One of ordinary skill in the art will recognize, however, that ideal conditions are rarely fully-achievable under real-world constraints.

Accordingly, one of skill in the art will recognize that embodiments taught herein encompass molds, molding apparatus and methods, molded articles, and mediums using at least one flow leader that are configured to produce less than ideal downstream flow conditions. For example, for multi-layer flow in accordance with embodiments taught herein, one or more flow leaders in a non-symmetrical portion of a mold cavity may be configured to produce a flow boundary in the mold cavity downstream of which (1) the velocity of the combined flow is substantially perpendicular to the periphery of the mold cavity but the velocity vector has a small tangential component, and/or (2) the velocity of the leading edge of the interior layer is greater than the product of the velocity of the combined flow front multiplied by the quotient of the flow distance from the leading edge of the interior layer to the periphery of the mold divided by the flow distance from the combined flow front to the periphery of the mold, such that at least a portion of the leading edge of the interior layer folds over before it reaches the desired position proximate to the periphery of the cavity. This flow boundary is a second example of symmetrical flow boundary.

As another example, for multilayer flow in accordance with embodiments taught herein, one or more flow leaders in a non-symmetrical portion of a mold cavity may be configured to produce a flow boundary in the mold cavity downstream of which (1) the velocity of the combined flow is substantially perpendicular to the periphery of the mold cavity but the velocity vector has a small tangential component, and/or (2) the velocity of the leading edge of the interior layer is substantially equal to, but less than, the product of the velocity of the combined flow front multiplied by the quotient of the flow distance from the leading edge of the interior layer to the periphery of the mold divided by the flow distance from the combined flow front to the periphery of the mold, such that the leading edge of the interior layer reaches the desired (albeit non-ideal) position proximate to the periphery of the cavity. This flow boundary is a third example of symmetrical flow boundary.

As previously discussed, downstream of a symmetrical flow boundary the velocity of the combined flow front ($V_F$) is substantially perpendicular to the periphery of the mold. For purposes of this disclosure, a uniform symmetrical flow boundary is one downstream of which the velocity of the leading edge of the interior layer ($V_I$) is either substantially equal to or greater than the product of the velocity of the combined flow front multiplied by the quotient of the flow distance from the leading edge of the interior layer to the periphery of the mold divided by the flow distance from the combined flow front to the periphery of the mold ($V_F*(L_I/L_F)$). Downstream of a uniform symmetrical flow boundary, the velocity of the leading edge of the interior layer ($V_I$) is not both substantially equal to and greater than the product of the velocity of the combined flow front multiplied by the quotient of the flow distance from the leading edge of the interior layer to the periphery of the mold divided by the flow distance from the combined flow front to the periphery of the mold ($V_F*(L_I/L_F)$)—in different sections. In contrast, downstream of a non-uniform symmetrical flow boundary, the velocity of the leading edge of the interior layer ($V_I$) is both substantially equal to and greater than the product of the velocity of the combined flow front multiplied by the quotient of the flow distance from the leading edge of the interior layer to the periphery of the mold divided by the flow distance from the combined flow front to the periphery of the mold ($V_F*(L_I/L_F)$)—in different sections.

Figure 6A:
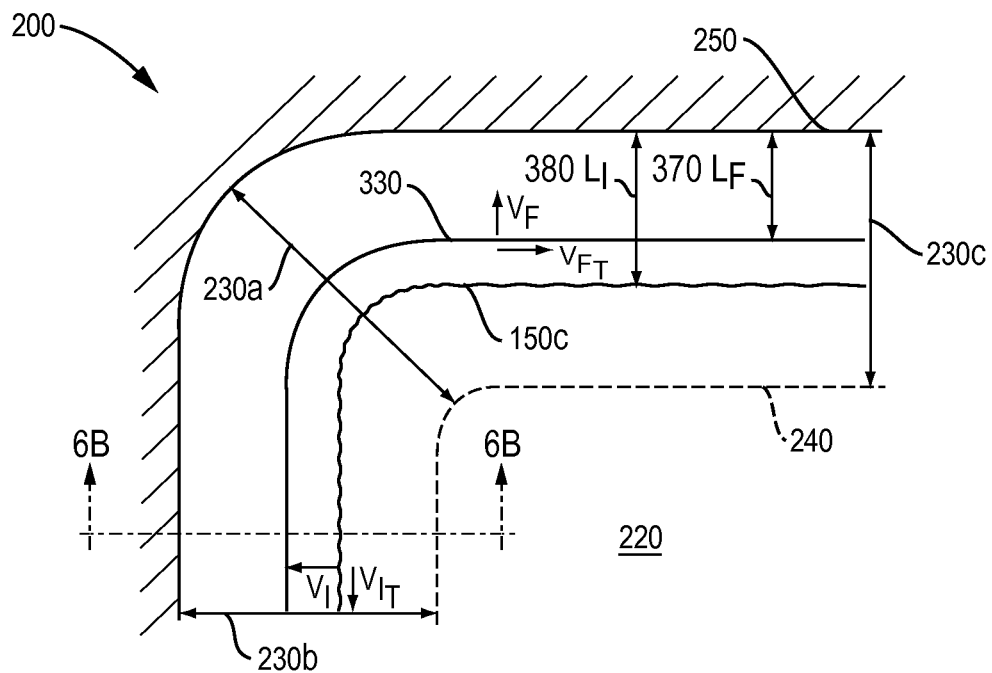
FIG. 6A is an illustrative view of an exemplary material flow according to various embodiments taught herein.

FIG. 6A schematically illustrates material flow in a non-symmetric portion of a mold cavity 220. At least one flow leader (not shown) in the non-symmetric portion of the cavity 220 creates a symmetrical flow boundary 240 downstream in the cavity. The flow front 330 of the combined flow 300 moves from the injection location (not shown) through the at least one flow leader in the non-symmetric portion of the mold cavity 220 and forms the symmetrical flow boundary 240 downstream of the flow leader(s).

In many cases the flow distance between the symmetrical flow boundary 240 and the periphery 250 may be uniform, and such boundaries may be described uniform symmetrical flow boundaries. In FIG. 6A, however, the flow distance 230a, 230b, 230c between the symmetrical flow boundary 240 and the periphery 250 of the cavity is not uniform. For example, the flow distance between the symmetrical flow boundary 240 and the periphery 250 of the cavity in FIG. 6A is greater at the corner 230a than along the sides as indicated by flow distances 230b, 230c. Boundary 240 in FIG. 6A may therefore be described as a non-uniform symmetrical flow boundary. Whether the boundary is uniform or not, flow symmetry and interior leading edge symmetry is achieved, under even the most strict definition, when at least one flow leader creates a flow whereby the quotient of the flow distance (between the boundary and the cavity periphery) divided by the corresponding velocity, for both the combined and the interior flow, remains approximately equal along the boundary.

Figure 6B:
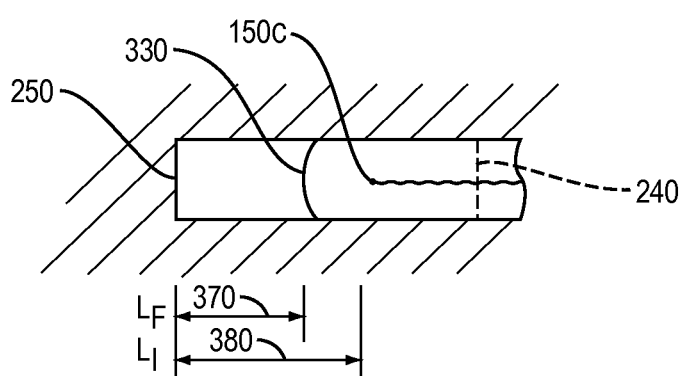
FIG. 6B is another illustrative view of the exemplary material flow in FIG. 6A according to various embodiments taught herein.

Between the symmetrical flow boundary 240 and the mold periphery 250 in FIG. 6A, certain flow conditions are met. For example, the flow in FIG. 6A is substantially perpendicular to the cavity periphery 250 between the symmetrical flow boundary 240 and the periphery 250. Moreover, the tangential velocity of the combined flow front 330 in FIG. 6A between the symmetrical flow boundary 240 and the periphery 250 is small, and preferably effectively zero. FIG. 6A also illustrates the leading edge 150c of the interior layer material flow farther from the periphery 250 of the non-symmetric portion of the mold cavity 220 than the flow front 330. The distance between the combined flow front 330 and the cavity periphery 250 is designated in FIG. 6A as the flow distance 370 ($L_F$). The corresponding velocity of the combined flow front is abbreviated as the flow front velocity ($V_F$). The greater distance between the interior layer leading edge 150c and the cavity periphery 250 is designated in FIG. 6A as the flow distance 380 ($L_I$). The corresponding velocity of the interior layer leading edge is abbreviated as the interior velocity ($V_I$). FIG. 6B illustrates a cross-section of FIG. 6A in the indicated position.

When the quotient of the flow distance 370 ($L_F$) divided by the flow front velocity ($V_F$) is less than the quotient of the flow distance 380 ($L_I$) divided by the velocity of the leading edge of the interior layer ($V_I$), the flow front 330 reaches the periphery before the leading edge of the interior layer 150c is proximate to the flow front. Under the foregoing circumstances, the desired coverage of the interior layer in molded article may not be attained. If the molded article has a wide flange, however, it may not be necessary for the interior layer to reach the periphery of the flange for the desired coverage of the interior material to be met with respect to the portion of the article to be sealed.

When the quotient of the flow distance 370 ($L_F$) divided by the flow front velocity ($V_F$) equals the quotient of the flow distance 380 ($L_I$) divided by the interior velocity ($V_I$), the flow front 330 and the leading edge of the interior layer 150c reach the periphery 250 at the same time. One of skill in the art will understand that the leading edge of the interior layer 150c preferably reaches the periphery 250 at approximately the same time as the flow front 330. Thus, ideal conditions are met when the foregoing quotients are equal. One of skill in the art will recognize, however, that meeting such conditions along the entire periphery 250 of a mold configured to create four or more articles may not be a practical goal.

One of skill in the art will further understand that foldover of the leading edge of interior layer may be preferable to gaps in the extension of interior layer to the portions of the article to be sealed. When the quotient of the flow distance 370 ($L_F$) divided by the flow front velocity ($V_F$) is greater than the quotient of the flow distance 380 ($L_I$) divided by the interior velocity ($V_I$), the leading edge of the interior layer 150c reaches the flow front 330 and fold over occurs before the flow front 330 reaches the periphery 250. Thus, one of skill in the art will understand to include at least one flow leader that is configured to produce, and possibly a plurality of flow leaders that together are configured to produce, the relationship between the foregoing quotients associated with the desired result.

Figure 7:
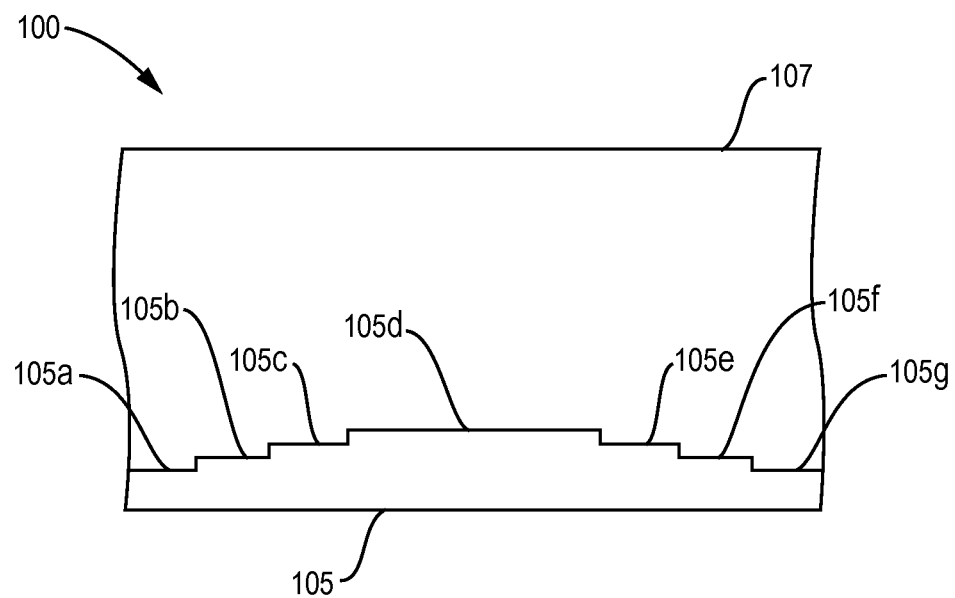
FIG. 7 is a somewhat schematic partial cross-sectional view of the container of FIG. 3A, along the indicated line, but with the wall thickness of container exaggerated for illustrative purposes.

Embodiments taught herein provide a molded product with different thicknesses in a nonsymmetrical portion thereof. Referring again back to FIG. 3A, each of the bottom portions 105a, 105b, 105c, 105d, 105e, 105f, 105g have different thicknesses than an adjacent portion. FIG. 7 schematically shows the cross-section of the container 100 of FIG. 3A taken along the indicated line. Even more so than in FIG. 3A, the wall thickness of the bottom 105 of the container 100 in FIG. 7 has been exaggerated for illustrative purposes.

Figure 8:
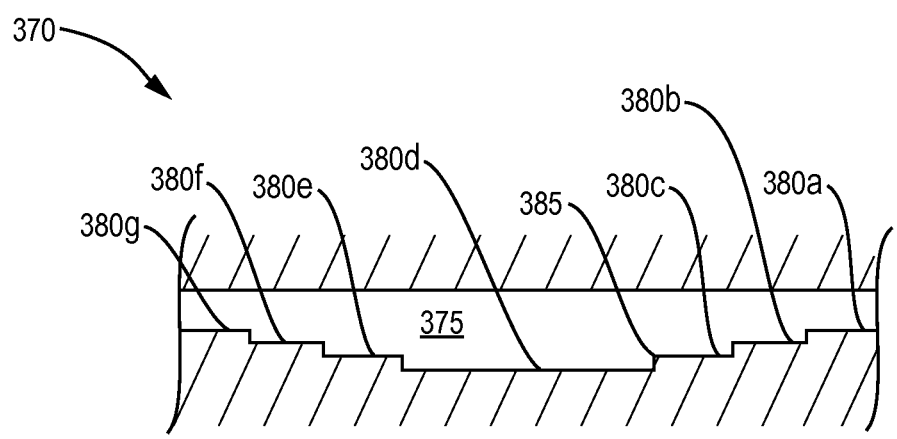
FIG. 8 is an embodiment of a somewhat schematic partial cross-sectional view of a mold for molding the cross-section shown in FIG. 7.

FIG. 8 schematically shows a cross-section of a mold 370 forming a mold cavity 375 that may be used to mold the cross-section depicted in FIG. 7. The mold cavity 375 thickness is illustratively exaggerated in FIG. 8, similar to FIG. 7. The flow leaders 380a, 380b, 380c, 380d, 380e, 380f, 380g have thicknesses selected so that the material flowing though each flow leader and exiting the distal ends thereof forms a symmetrical flow boundary proximate to the periphery of the non-symmetrical portion of the mold. The material passing though the symmetrical flow boundary may then reach the periphery of the non-symmetric portion of the mold cavity at substantially the same time, with desirably, substantially the same flow rate.

The flow leaders 380a, 380b, 380c, 380d, 380e, 380f, 380g may be formed in the mold by using known methods to form flow leaders in injection molds. In the embodiment of FIG. 8, the edge or transition 385 between adjacent flow leaders 380c and 380d is relatively sharp or square. Such transition configurations are conducive to fabrication, as square edges are nominally formed by many machining processes, e.g., milling, and do not require additional processing.

Figure 9:
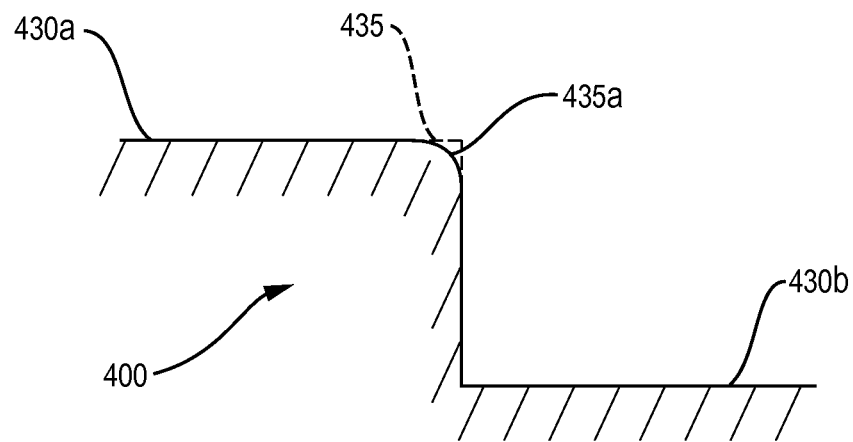
FIG. 9 is a somewhat schematic partial cross-sectional view of an alternative embodiment of a mold.

Alternatively, as shown in FIG. 9, in the mold 400, which is shown in magnified view, the square transition 435 (shown in dotted lines) between adjacent flow leaders 430a, 430b is processed by suitable means, for example, by machining, to provide a contoured, e.g., radiused, chamfered, rounded, etc., transition 435a. Such contoured transitions may involve additional processing to form than sharper transitions (depending on fabrication method), yet may provide smoother material flow.

Figure 10:
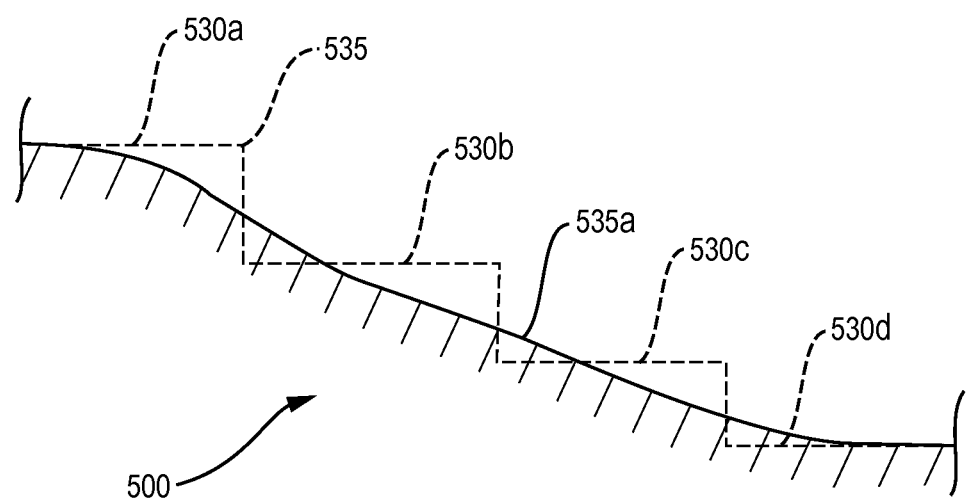
FIG. 10 is a somewhat schematic partial cross-sectional view of yet another alternative embodiment of a mold.

As a further alternative, a flow leader may have variable or varying thicknesses. As illustratively depicted in FIG. 10, in the mold 500, the flow leader 535 (shown in dotted lines) has multiple segments 530a, 530b, 530c, 530d, each of a different thickness. In yet other embodiments, a flow leader may be configured to have a varying thickness without discrete or sharply defined segments. As also shown in FIG. 10, the flow leader 535a (shown in a solid line) has a varying thickness with smoother contouring than flow leader 535. Such segmenting or contouring of the flow leader may be achieved by providing the mold with the desired shape, e.g., by machining. Similarly, referring again to FIG. 9, the transitions between adjacent flow leaders 430a, 430b, etc. may be contoured, e.g., by shaping or machining of the mold utilizing the transitions 435, so that the profile of the mold across the flow leaders is more continuous like flow leader 535a in the mold shown in FIG. 10.

The configuration (e.g., size and shape) of the flow leaders may depend to significant degree on the configuration of the mold cavity and, ultimately, the configuration of the molded article. Generally, each flow leader may be configured to direct a portion of the material flow along its anticipated flow path. This minimizes flow disruptions. For example, in the embodiment of FIG. 3A, the bottom 105 of the container 100 is generally planar and has a generally uniform thickness (not accounting for the flow leaders). Accordingly, it is anticipated that the bulk flow of the material is generally radially from the injection location 140. Thus, the flow leaders may extend radially from the injection location 140, having a wedge or pie-shape to form wedge-shaped bottom portions 105a-105g. Those in the art should understand, however, that with molded articles (and hence, mold cavities) having different configurations than shown in FIG. 3A, the anticipated flow paths may not be radial and the flow leaders may not be pie-shaped. Those of ordinary skill in the art should understand how to shape the flow leaders so as to best conform to the anticipated flow paths.

One need also select the number of flow leaders to be used in the mold. In this regard, a larger number of flow leaders may provide more precise flow control, and may provide greater interior layer coverage. However, an increased number of flow leaders may require more complicated mold fabrication, e.g., fabricating a large number of separate flow leaders. Further, there may be practical ceilings on the number of flow leaders that may be provided due to limitations of the fabrication process itself. For example, in embodiments where the flow leaders are machined into the mold, the capabilities of the machining equipment may dictate a finite number of flow leaders. Therefore, for ease of fabrication, the smallest number of flow leaders that can produce the desired coverage may be used.

As discussed above, disruption to formation of a uniform periphery in the interior layer may be caused by variations in flow path length in the mold cavity. The use of multiple flow leaders or at least one variable-thickness flow leader compensates for this by locally modifying the thickness of the mold cavity such that material flow rates and flow times through the mold cavity, e.g., in the non-symmetric portion(s), are more consistent. In reality, the material flow path length within a flow leader varies due to the non-symmetric configuration of the mold. Referring to the bottom portion 105d in FIG. 3A as an example, as it generally corresponds to flow leader 380d (FIG. 8), the flow path length along the center of flow leader, i.e., forming the center of the bottom portion 105d, is longer than the flow paths where the flow leader adjoins flow leaders 380c and 380e. This is seen in FIG. 3A where the center of bottom portion 105d is longer than at the edges of bottom portion 105d where it adjoins bottom portions 105c and 105e.

Figure 1:
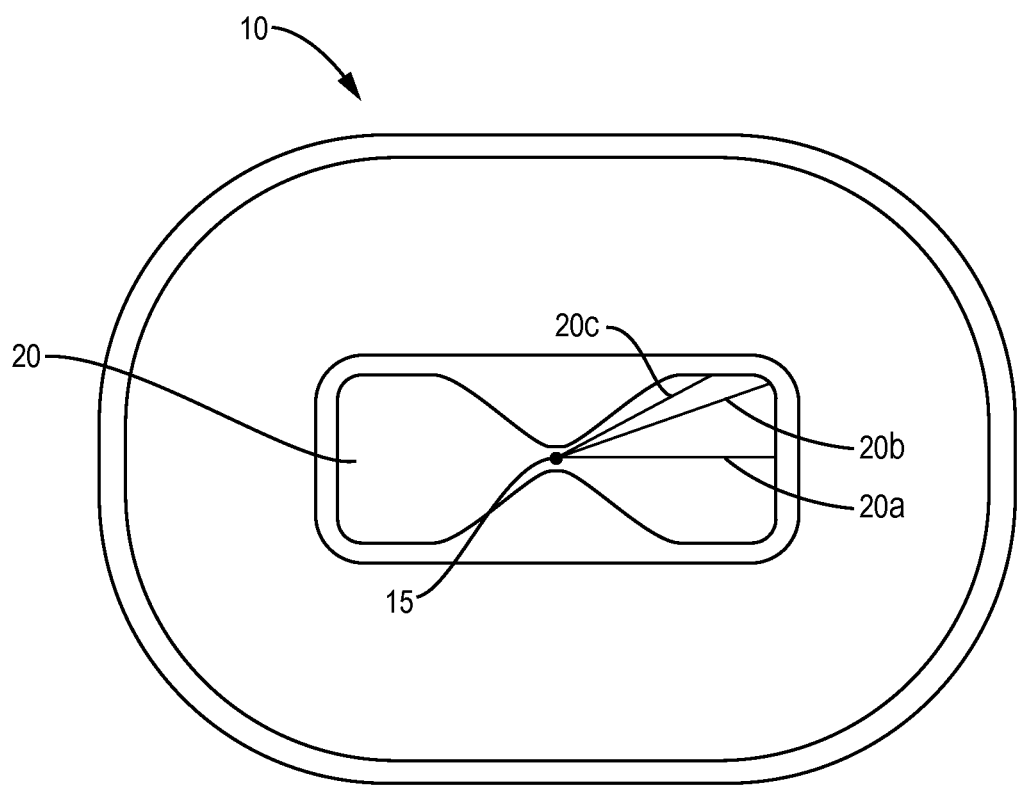
FIG. 1 is a top view of a prior art injection molded article containing a flow leader.

The epitome of this aspect is demonstrated in previously known single thickness flow leader configurations, such as shown in FIG. 1. The flow path lengths 20a, 20b and 20c in flow leader 20 are too different to permit formation of adequate interior layer coverage. By using a larger number of flow leaders, the flow leaders are smaller, e.g., narrower, and flow path length variation within a flow leader is decreased.

In addition, when using a smaller number of flow leaders, the difference of flow path length(s) between adjacent flow leaders is greater, resulting in greater variation in flow characteristics between flow leaders. Although flow leader thicknesses assist to compensate for this, if the differences in the flow path lengths are too great, the interior layer coverage may not be adequate. Thus, the number, and hence size, of flow leaders may be selected so as to avoid detrimentally large flow length differences between adjacent flow leaders. The inventor has found that when the flow leaders are provided so that flow path lengths between adjacent flow leaders are within about 5%-15%, an adequate interior layer results. Nonetheless, other variations in flow path length may produce adequate coverage and are within the scope of the embodiments taught herein. For example, a single larger flow leader whose thickness varies with the flow requirements would also produce adequate interior layer results. For adjacent variable-thickness flow leaders, the difference between the flow path lengths may be quite large, on the order of 100% or more, when the variable-thickness differences are sufficient to compensate for the large flow path length differences. Those of ordinary skill in the art should be able to select acceptable flow path length variations based on the particular application of the various embodiments, for example and without limitation, the configuration of the mold cavity and molded article, the molding process(es) used, the materials utilized, mold fabrication capabilities, economic considerations, acceptable tolerances for the particular application, etc.

Once the flow leader configuration is selected, the material flow characteristics for each flow leader may be determined. As discussed above, a significant factor in the formation of an interior layer with adequate coverage is the interior layer leading edge in the flow leaders reaching the periphery of the non-symmetric portion of the mold cavity at substantially the same time, and desirably, at substantially the same flow rate. The flow time and flow rate at the non-symmetric periphery may be calculated for each flow leader. This may be accomplished by various methods and tools that are known and available to those of ordinary skill in the art, as known mold flow analysis techniques may be utilized. For example, various commercially available software programs are available that will simulate/model the material flow for the selected mold configuration. Suitable computer programs are available, by way of example only, from Moldflow Corporation of Framingham, Mass. Those of ordinary skill will appreciate other suitable computer programs, that are either currently available or become available in the future.

In some embodiments, the pressure drop across each flow leader is utilized. Generally, pressure drop is inversely correlated to flow rate. Table 1 depicts a prophetic example of a molded article having a wall thickness of 0.6 mm (e.g., minimum design thickness), molded utilizing a frozen layer thickness of 10%, providing a nominal flow thickness of 0.54 mm.

TABLE 1

| Segment | Flow Path Length mm | ΔP @ Nominal Thickness psi | Flow Thickness @ Uniform ΔP (1614 psi) mm | Wall Thickness for Uniform ΔP mm |
| --- | --- | --- | --- | --- |
| 1 | 24.4 | 1614 | 0.540 | 0.600 |
| 2 | 25.8 | 1747 | 0.564 | 0.627 |
| 3 | 28.4 | 2003 | 0.609 | 0.676 |
| 4 | 32 | 2364 | 0.667 | 0.742 |
| 5 | 35.5 | 3220 | 0.792 | 0.881 |
| 6 | 38.5 | 3354 | 0.811 | 0.901 |
| 7 | 40.6 | 3098 | 0.776 | 0.862 |
| 8 | 41.1 | 2958 | 0.756 | 0.840 |
| 9 | 40.6 | 3692 | 0.717 | 0.797 |
| 10 | 40.0 | 2646 | 0.711 | 0.790 |

As shown in Table 1, longer flow paths produce generally higher-pressure drops that generally correlate to decreases in material flow rates. Adjusting the thicknesses of the flow leaders, e.g., increasing them, thus adjusting the material flow thicknesses, lowers the pressure drop in the flow leaders to a substantially uniform level. In the above example, the flow thicknesses are increased so that the calculated pressure drops in all flow leaders are substantially equal to the lowest calculated pressure drop at nominal flow thickness. In this example, the lowest pressure drop at nominal thickness occurs in the flow leader with the shortest flow path length.

Alternatively, material flow resistance (which can include friction between the injected material and the walls of the mold cavity) may be calculated or measured, e.g., using known methods, and utilized to determine mold thicknesses that would help balance material flows along different flow path lengths. Flow resistance is greater along longer flow path lengths. By increasing thickness along a flow path, flow resistance generally decreases. Thicknesses of various flow paths, whether between flow leaders, between segments of a flow leader, or within a flow leader of varying thickness, may thus be provided to lower flow resistance in longer, higher resistance flow paths so that material flow exits the flow paths at substantially the same time.

In yet other embodiments, the flow leader configurations, e.g., thicknesses, may be determined experimentally. In such embodiments, the material is injected into the mold and the material flow characteristics are experimentally measured or otherwise determined, using means that should be known to those in the art. The experimental results may then be used to modify the flow leader configuration, e.g., adjust the thicknesses, the results of which may again be experimentally determined. The experimental process may continue until acceptable results are reached, e.g., substantially consistent material flow characteristics.

Further, even when the flow leaders are initially configured non-experimentally, the configuration may be tested experimentally. The experimental results may be used to verify or adjust the non-experimental modeling results.

Yet further, the coverage of the interior layer in the molded article may be experimentally assessed. This may be accomplished in various manners as will be appreciated by those of ordinary skill in the art. One such manner, by way of non-limiting example, is to provide the interior layer material with a different observable characteristic, for example, color, than the outer layer material. When such a process is used, the coverage of the interior layer within the article, i.e., within the contrasting outer layer, may be visually assessed. Another method is to assess the gas permeation of the molded article (see FIG. 2). While the just-described methods provide various manners of assessing, those in the art should recognize other suitable methods by which to assess the coverage of the interior layer.

Those skilled in the art should also understand that the above-described methodologies for configuring the flow leaders are illustrative only. The various embodiments contemplate utilizing any suitable methodology that is either presently known or will become known. Those of ordinary skill should appreciate what methodologies are suitable for use with the various embodiments.

It should also be noted that in FIG. 3A, the bottom 105 is symmetric about any axis that passes through the injection location 140 along the plane of the bottom 105. Accordingly, the container 100 is comprised of four substantially identical wedge-shaped quadrants that intersect at the injection location 140a. As the quadrants are essentially geometrically identical, the flow leaders for the entire container 100 may be modeled using only one of the quadrants. In other words, the flow leaders at corresponding locations in the other quadrants may be produced similarly to those in the modeled quadrant. This avoids the need to model the entire container, simplifying the modeling process.

Figure 11:
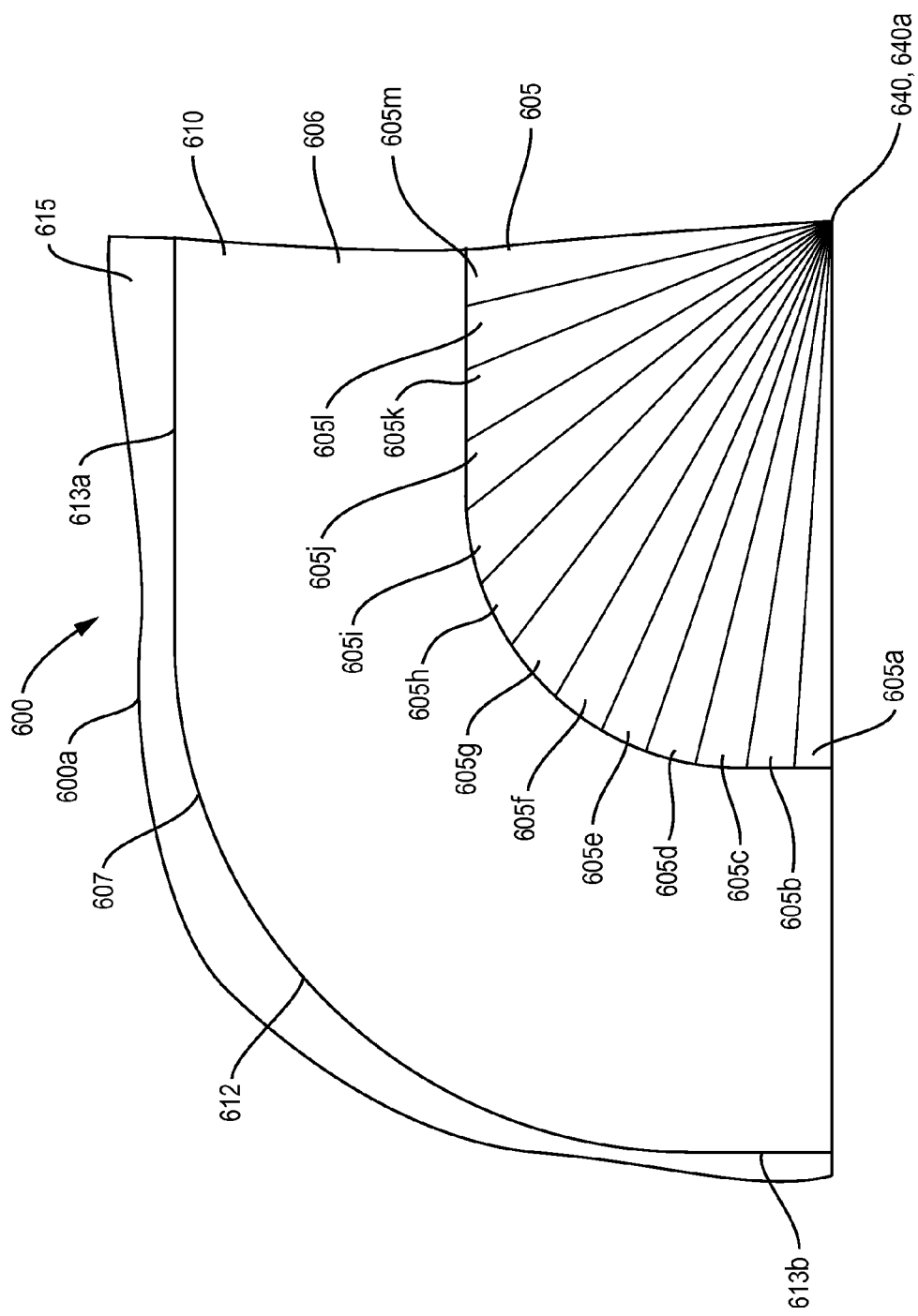
FIG. 11 is a plan view of a model for another embodiment of a container.

An example of this is the container 600 shown in FIG. 11. The container 600 is similar to container 100, and therefore like parts are labeled with similar reference numbers, beginning with "6" instead of "1." Quadrant 600a of the container 600 is geometrically identical to the other four quadrants of the container 600 (not shown), i.e., they are mirror images of the quadrant 600a. Thus, the entire mold for the container 600 may be modeled using the one quadrant 600a. In this illustrative embodiment, the model for the quadrant 600a utilizes thirteen (13) theoretical bottom portions 605a-605m, and the mold flow leader thickness corresponding to each theoretical bottom portion may be determined in the manner discussed above. The flow leader profile(s) corresponding to the quadrant 600a may then be used for the remaining three quadrants of the mold. In this manner, the entire mold may be designed based on the quadrant 600a model. Those skilled in the art will understand that this methodology may be utilized for any container that is "dividable" into two or more substantially identical geometrical segments. Conversely, this methodology is not applicable if the molded article cannot be "divided" into identical or very similar geometrical segments.

It should be also noted that merely because the model illustrated in FIG. 11 utilizes thirteen bottom portions does not necessarily mean that the corresponding portion of the mold necessarily contains thirteen flow leaders. Various circumstances may dictate or advise a different number of flow leaders. For example, it may be that the determined thicknesses of adjacent flow leaders are the same, such that the mold may contain only one flow leader instead of two. More specifically, if, by way of example only, the theoretical thicknesses of the flow leaders corresponding to bottom portions 605h, 605i, 605j and 605k are, respectively, 0.032", 0.029", 0.029", and 0.027", the mold contains only one 0.029" thick flow leader between flow leaders with thicknesses of 0.032" and 0.027". In addition, the difference in theoretical thicknesses between adjacent flow leaders may be so small that it may be unnecessary to provide separate flow leaders. Alternatively, the "combined" flow leader may be provided with the average of the theoretical thicknesses. Yet further, the obtainable precision and accuracy of the mold fabrication process may factor. In all such instances, it may be desirable to recalculate the flow rates using the adjusted thicknesses to ensure any flow variance caused by the deviation from the theoretical thicknesses are not significant enough to impact the permeability of the article, e.g., barrier coverage.

In both the embodiments shown in FIG. 3A and FIG. 11, the flow path lengths along the sidewall 110, 610 are substantially equal because the sidewall has a consistent contour and height around the circumference of the container. Thus, if the flow streams of the interior layer 150 reaches the portion of the mold cavity that forms the sidewall 110, 610 after passing through a symmetrical flow boundary, the flow front of interior layer material 150 advances along the sidewall portion of the mold with the desired flow characteristics and forms a comprehensive interior layer 150. Moreover, if the flange 115 has a consistent width as in the embodiment of FIG. 3A, the interior layer material 150 advances with the desired flow characteristics along the flange-forming portion of the mold cavity and forms a comprehensive interior layer 150 in the flange 115. Similarly, if the flow streams of the interior layer 150 reaches the portion of the mold cavity that forms the sidewall 110, 610 at the same time and with the same flow rate, the flow front of interior layer material 150 advances consistently along the sidewall portion of the mold and form a consistent interior layer 150. Moreover, if the flange 115 has a consistent width as in the embodiment of FIG. 3A, the interior layer material 150 advances consistently along the flange-forming portion of the mold cavity to form a consistent interior layer 150 in the flange 115. As noted above, though, in some embodiments the formation of an interior layer 150 in the flange, particularly toward the end of the flange 115, may not significantly affect permeation.

If, on the other hand, the container sidewall does not have a consistent contour or configuration, the flow path lengths at different locations of the sidewall will differ. This may curtail adequate interior layer 150 formation in the sidewall (and the flange 115) in such instances, the principles of the invention as described above may also be applied to the sidewall-forming portions of the mold. Similarly, in the embodiment of FIG. 11, the flange 615 has areas of increased width, resulting in increased flow path length. Again, if necessary or desired, the various embodiments may be implemented to compensate for the different flow path lengths.

Yet further, in the embodiment of FIG. 11, the sidewall 610 is not oriented at a right angle to the bottom 605, but continues to expand radially outward, i.e., the container cavity 606 "widens" toward the open end 607. Though the flow path length is still consistent, the area of the sidewall increases in the corner portions 612 toward the open end 607. As the area increases, the volume of material needed to form the corner portions is greater than that required for the straight portions 613a, 613b. Accordingly, the flow leaders feeding material to the corner portions 612 may be adjusted to provide the greater volumetric flow rate needed to provide consistent advancement of the interior layer material 150 flow front. A similar situation exists in the areas of the flanges 115, 615 adjacent the corner portions 112, 612 as they too increase in area extending from the top of the sidewall 110, 610 at these locations. Similar compensatory adjustments may be made.

In addition, as shown in FIG. 1, the container 100 has one (1) injection gate location 15. This is typical with containers such as shown in FIG. 1, as it often presents the simplest manufacturing process. It should be understood, of course, that the flow leader embodiments taught herein are not limited to containers molded using a single gate, and the flow leader embodiments taught herein contemplate and are applicable to the use of multiple injection gates, as may be desired or preferred depending on the particular article to be molded, the complexity of the mold, and other factors that will be understood by those of ordinary skill in the art.

Figure 12:
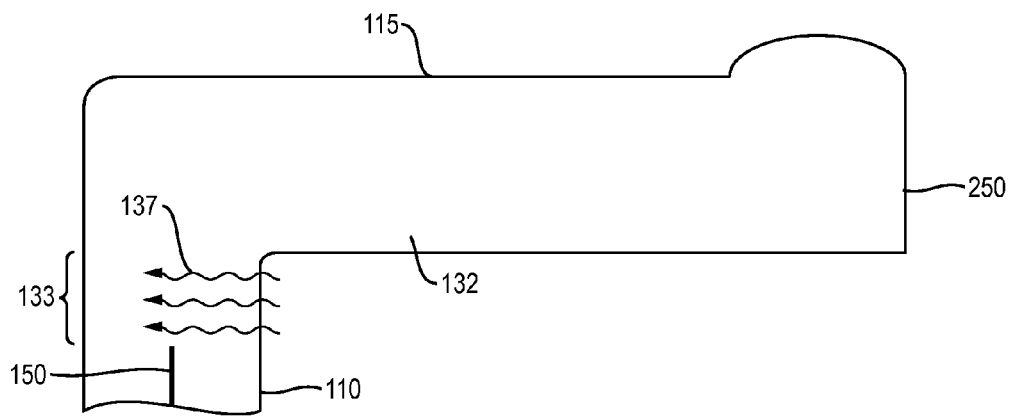
FIG. 12 is an enlarged view of a prior art flange portion.

It should also be understood that practical application process variations may exist by which the flow of the interior layer material may vary from the calculated flow characteristics. Such process variations may include, by way of example only, manufacturing tolerances in mold cavity dimensions and surface finishes, local temperature variations, injection pressure variations, normally occurring streamline variations, limitations of calculation methodologies used, lot-to-lot variation of the properties of the inner, outer, and/or interior layer material, etc. that will be understood by those of ordinary skill in the art. As an example, as shown in FIG. 12, process variations can prevent the interior layer 150 from reaching the periphery 250 of the mold cavity, which leaves an unprotected portion 133 on the outer layer 132 and inner layer 130 through which gas 137 may permeate. This may occur, by way of example referring to FIG. 12, when the interior layer material 150 lags the flow front, and thus the flow front reaches the end 250 of the mold cavity (the end of flange 115) before the interior layer material 150 reaches the flange.

Figure 13:
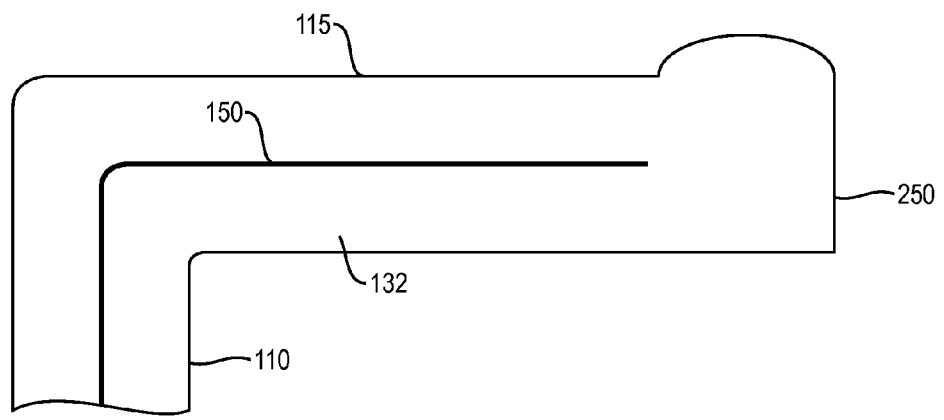
FIG. 13 is an enlarged view of the flange portion shown in FIG. 3B.

However, the inventor has found that when the various flow leader embodiments were implemented, these process variations do not significantly disrupt the formation of a high coverage barrier layer, or can be iteratively adjusted to obtain a desired barrier coverage. Thus, a high coverage interior layer 150 may be obtained as shown in FIG. 13.

Figure 14:
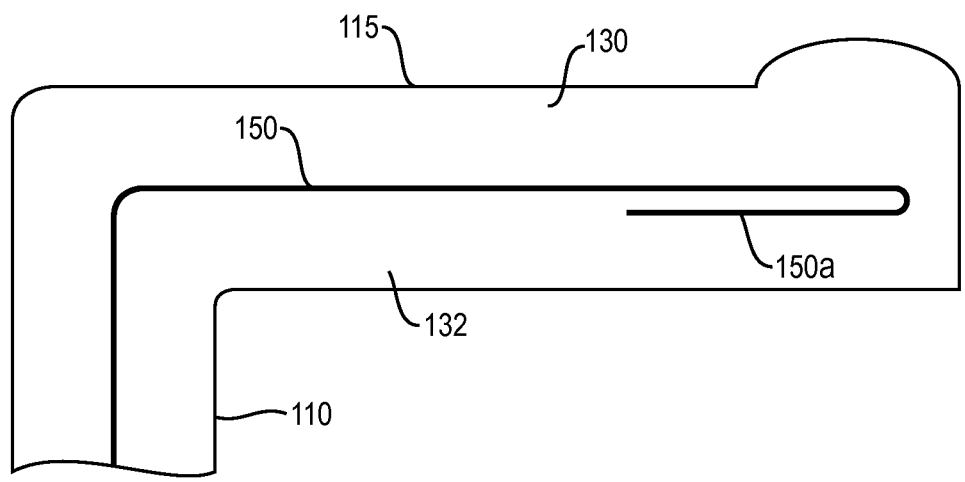
FIG. 14 is an enlarged view of an alternative embodiment of the flange portion shown in FIG. 3B.

The flow leader technology and related molds, apparatuses, and methods of the embodiments taught herein may be used alone, or as discussed above, in conjunction with fold over or wrapping of the interior layer to form a multiple layer molded article. Various embodiments may thus utilize fold over, e.g., the methods and apparatuses disclosed in U.S. Pat. No. 6,908,581, which is hereby incorporated by reference in its entirety, to prevent breakthrough of the interior layer material through the flow front of the combined layer flow. Referring again to FIG. 5A, the injection is performed so that the flow of the interior layer material 150 is offset from the zero velocity gradient 340 ($V_{max}$) of the material flow, yet on a streamline having a greater velocity than the average flow velocity ($V_{ave}$). As depicted in FIG. 14, this prevents the interior layer material 150 from breaking through the flow front 330. Rather, the interior layer material 150 folds over and remains within the outer layer 132 and inner layer 130.

These foldover processes may also be utilized to adjust for the above-mentioned process variations, particularly for high output production systems having multiple mold cavities. For example, one way to adjust for incomplete coverage as shown in FIG. 12 is to control the injection parameters of the interior layer material 150 (e.g., injection timing, location, pressure, etc.) so that the interior layer material 150 does not lag behind the combined flow front. However, as discussed in the aforementioned U.S. Pat. No. 6,908,581, this can cause the interior layer material 150 to break through the flow front. Conversely, if breakthrough is occurring, the parameters can be adjusted so that the interior layer material 150 does not catch up to the flow front. This, though, can cause incomplete coverage, e.g., as in FIG. 12.

Implementation of a foldover process can mitigate these issues. Using a foldover process, the injection parameters can be controlled so that interior layer material 150 reaches the end of the mold cavity substantially throughout the molded article without breakthrough concern. Additional interior layer material 150 simply continues to fold over behind the flow front to the degree necessary to accommodate the surplus interior layer material 150, which may occur in portions or all of any one cavity or cavities in a multi-cavity production system.

In embodiments where a heat seal may be utilized, a fold over process may be used as described in commonly owned U.S. Patent Application Ser. No. 61/416,903, entitled "HEAT-SEAL FAILURE PREVENTION METHOD and ARTICLE" and filed Nov. 24, 2010, which is incorporated by reference herein in its entirety. As described therein, and as depicted in FIG. 14, the interior layer 150 can be offset to the side of the outer layer 132 that is opposite from the surface of the flange 115 that forms the heat seal. In this manner, the foldover portion 150a does not interfere with the structural integrity of the heat seal.

It should be noted that in such embodiments where a lid or other closure is heat sealed to the container 100, the heat seal itself does not contain the interior layer 150. However, the heat seal itself is typically very thin, particularly in relation to its length. Further, in embodiments where the lid is sealed to the flange 115, the total exposed surface area between the interior layer 150 and the heat seal lid is very small, especially in comparison with the container itself, and gas permeation though the heat seal area is not significant.

Figure 15:
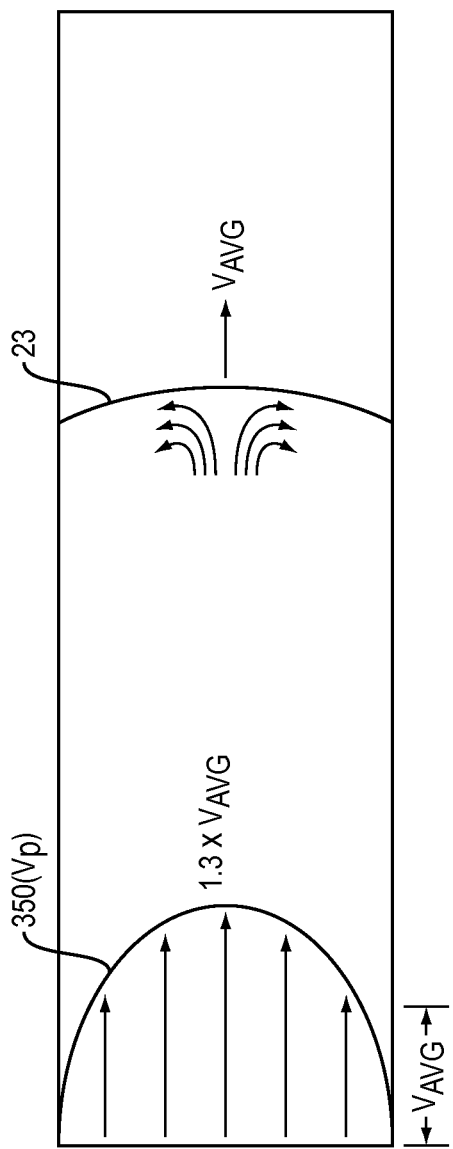
FIG. 15 is a cross-sectional view of the fountain flow effect of a combined polymeric stream as it flows along an annular pathway of a mold cavity.

FIGS. 15 through 16A-B illustrate material flow properties, which may be leveraged in conjunction with flow leader technology disclosed herein to produce fold over in the interior layer as needed to attain the desired coverage. FIG. 15 depicts the fountain flow effects whereby flowing material upstream of the flow-front 23 has a velocity profile 350 ($V_P$) such that the volumetric flow rate is fastest in the middle and slowest at or near the interface of the polymeric stream and the walls of the channels of the mold cavity.

FIGS. 16A and 16B depicts the velocity profile 350 ($V_P$), where the combined stream is fastest at point "A" and slower at points "B" and "C". The zero-velocity gradient 340 occurs at the point where the velocity of the flow is greatest. Because the flow at the zero-velocity gradient streamline is greater than the average velocity of the flow-front, the interior material injected at or near the zero velocity gradient point can, under some circumstances "catch up" to and pass the flow-front and break through the skin, even if injection of the interior material begins after injection of the inner and outer layers (PET, PC, HDPE, or PP). The interior core stream material breaks through after the interior material reaches the flow-front of the combined polymeric stream.

FIG. 16B shows that as the particles initially at points A, B, and C respectively move downstream, they move farther apart from each other due to velocity profile 350. After a first period of time elapses, the particles will have moved to new locations designated as $A_1$, $B_1$, and $C_1$ respectively. After a second period of time elapses, the particles will have moved to new locations designated as $A_2$, $B_2$, and $C_2$ respectively. The relative location of the particles at the successive times demonstrates the effect of the velocity profile 350 over time. Since flow velocity at point A is greater than the velocity at point B, the particle starting at point A will move farther over time than the particle starting at point B. Similarly, since flow velocity at point B is greater than the velocity at point C, the particle starting at point B will move farther over time than the particle starting at point C.

Figure 17:
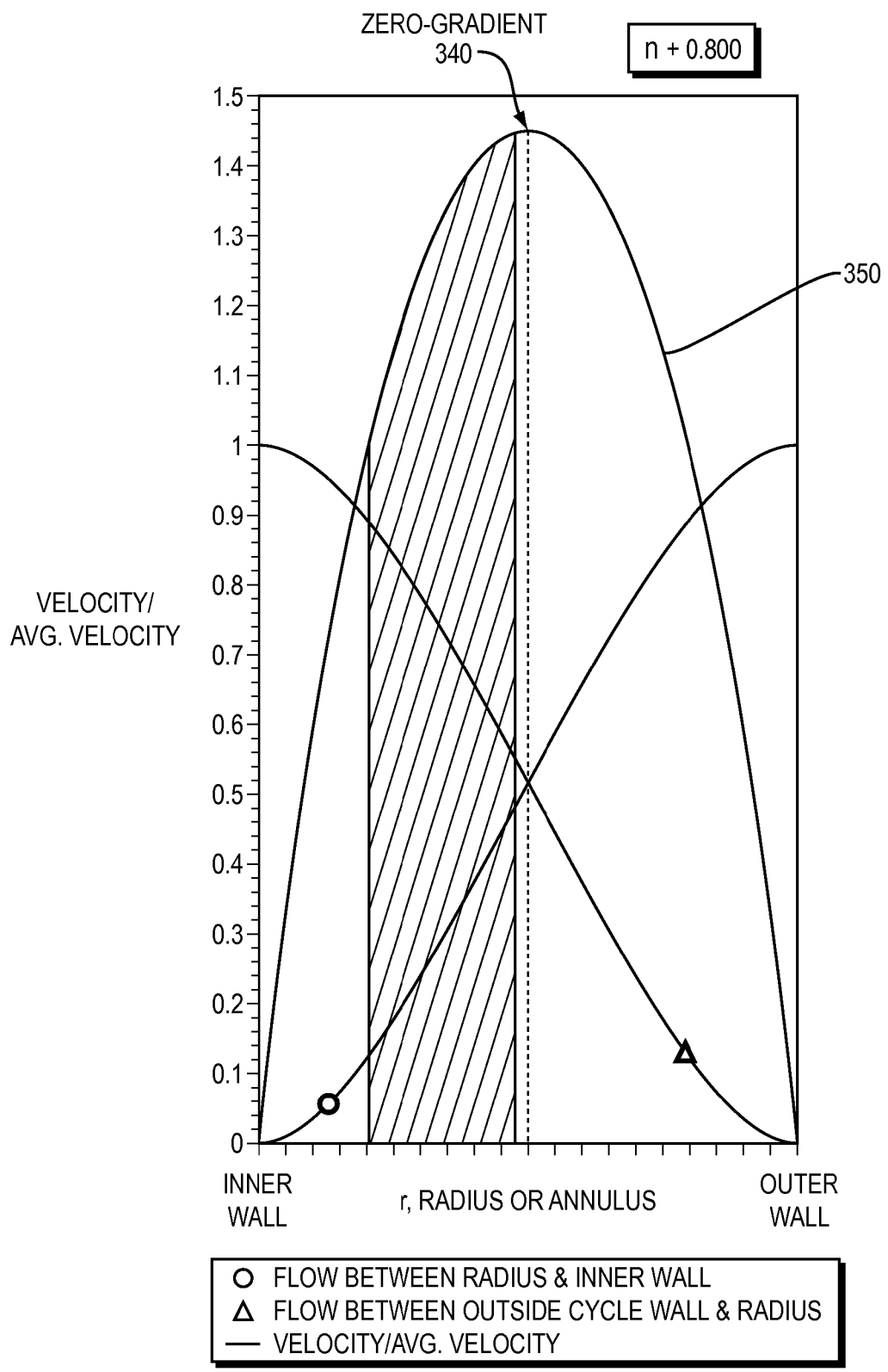
FIG. 17 is a graph illustrating resulting flow fraction and velocity profile curves across the annular channel within a nozzle.

FIG. 17 plots the ratio of flow velocity-to-average flow velocity as a function of the radius of the annulus between the inner and outer flow channel walls. FIG. 17 depicts the normalized velocity profile 350 and volume fraction inside and outside for a fluid with n=0.8 (where n is the parameter for the non-Newtonian power law model of fluid flow). The zero gradient 340 for the combined flow stream (CF) is marked on the normalize velocity profile 350. The curve designated with a circle marker plots the inner flow (IF) between the radius and the inner cylindrical wall T from the inner to the outer wall. The curve marked with a triangle plots the outer flow (OF) between the outer cylindrical wall and the annular radius. The hatched area shows the acceptable location for interior layer placement that is both greater than the average velocity and off the zero velocity gradient 340. The interior layer material placed within this area will wrap to the inside of the part. From the graph we can see that the flow fraction of the inside layer can be in a range from 0.1 to 0.45. The flow fraction of the outside layer can be from 0.9 to 0.55. The interior layer thickness can be as thick as about 25% of the thickness of the flowing layer which is about 35% of the flow fraction, 0.1 to 0.45. If the hatched area were on the opposite side of the zero velocity gradient 340, the flow fraction of the inside layer and outside layer would be of similar magnitude, but inversed.

Figure 18A:
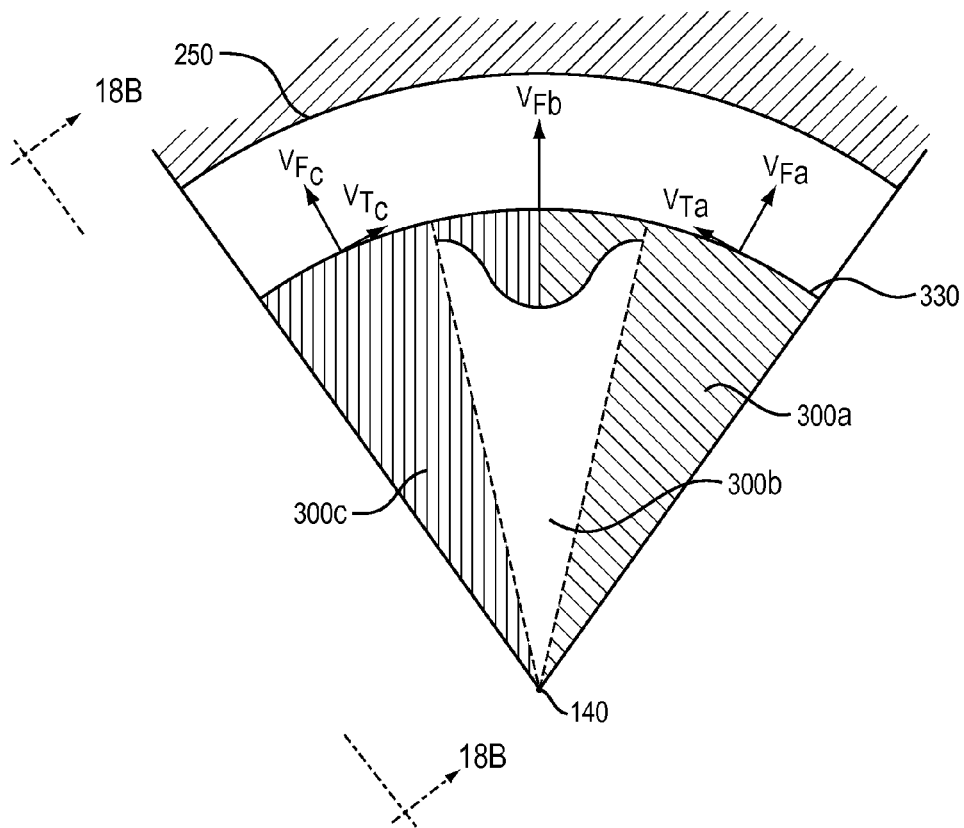
FIG. 18A is an illustrative view of material flow in a portion of a mold cavity.

FIGS. 18A through 21C illustrate imperfect flow, such as may be produced by an imperfect flow leader, and the potential effect of a timing adjustment on the product of that flow. FIGS. 18A and 18C illustrate a segment of a mold cavity chosen to illustrate imperfect flow within the cavity. FIGS.

18A and 18B illustrate conditions that cause tangential flow at the flow front 330. FIG. 18C illustrates the effect of tangential flow on the interior layer leading edge 150c. In FIGS. 18A and 18C, the combined flow 300 begins as material is injected at an injection gate at location 140 and moves toward the periphery 250 of a mold cavity. In FIGS. 18A and 18C, the combined flow 300 is divided into the same three segments 300a, 300b, and 300c. The flow front 330 of the combined flow 300 is illustrated in FIGS. 18A, 18B, and 18C as it moves toward the periphery 250 of the mold cavity in a direction that is substantially perpendicular to the periphery 250.

As illustrated in FIG. 18A, the velocity of the flow front ($V_F$) in each segment is approximately equal. The velocities of the flow front in segments 300a and 300c ($V_{Fa}$ and $V_{Fc}$, respectively) have a small tangential component direct toward middle segment 300b. As illustrated in FIG. 18A, the small tangential component of the velocity of the flow front in segment 300a ($V_{Ta}$) causes material from the combined flow in segment 300a to flow into the combined flow in segment 300b. Similarly, the small tangential component of the velocity of the flow front in segment 300c ($V_{Tc}$) causes material from the combined flow in segment 300c to flow into the combined flow in segment 300b.

Figure 18B:
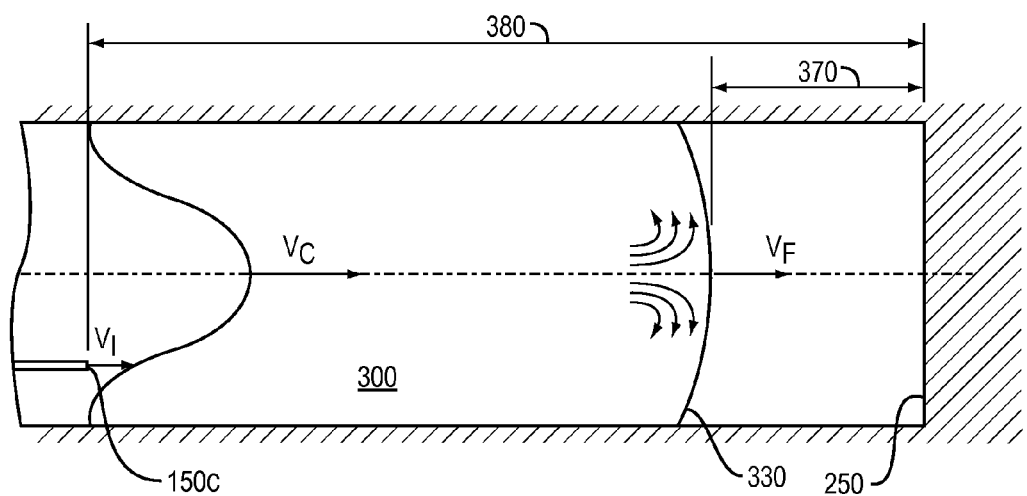
FIG. 18B is an illustrative view of material flow in a cross-section of FIG. 18A.
Figure 18C:
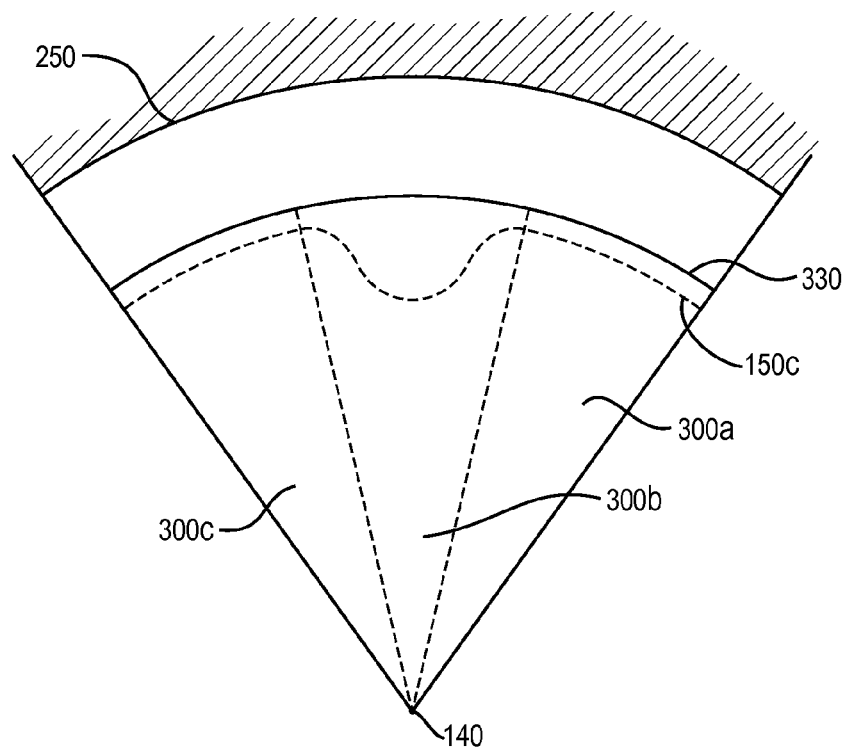
FIG. 18C is another illustrative view of material flow in the portion of the mold cavity illustrated in FIG. 18A.

FIG. 18B is a cross-sectional illustration of the flow in a segment of the cavity illustrated in FIG. 18A. FIG. 18B illustrates the fountain flow effect that occurs at the flow front 330. FIG. 18B further illustrates the centerline velocity ($V_C$), which may be the zero gradient velocity. A centerline velocity $V_C$ in one segment of the combined flow 300 that is greater than the centerline velocity $V_C$ in an adjacent segment creates a tangential component in the flow front velocity $V_T$ in the faster flowing segment.

FIG. 18B specifically illustrates a cross-section of the flow in segment 300c of FIG. 18A. A centerline velocity in segment 300c ($V_{Cc}$) that is greater than the centerline velocity in segment 300b ($V_{Cb}$) creates the tangential component in the flow front velocity in segment 300c ($V_{Tc}$) directed toward segment 300b as illustrated in FIG. 18A. A cross-sectional illustration of the combined flow in segment 300a would be similar to FIG. 18B. And a centerline velocity in segment 300a ($V_{Ca}$) that is greater than the centerline velocity in segment 300b ($V_{Cb}$) similarly creates a tangential component in the flow front velocity in segment 300a ($V_{Ta}$) directed toward segment 300b as illustrated in FIG. 18A.

FIG. 18C illustrates the interior layer leading edge 150c within the combined flow 300. In particular, FIG. 18C illustrates that the interior layer leading edge 150c lagging behind the flow front 330 in segment 300b, particularly in comparison to the position of the interior layer leading edge 150c with respect to the flow front 330 in segments 300a and 300c. The interior layer leading edge 150c lags in segment 300b due to the tangential flow components of the flow front velocity $V_T$ in segments 300a and 300c. FIG. 18C illustrates a flow boundary that is not a symmetrical flow boundary.

Returning to FIG. 18B, we note that FIG. 18B further illustrates the interior layer leading edge 150c in combined flow 300. The interior layer leading edge 150c has its own velocity ($V_I$). The ratio of the flow front velocity $V_F$ over the leading edge velocity $V_I$ is determined by the offset of the interior layer from the flow centerline. Accordingly, the offset of the interior layer from the flow centerline can be selected to get the desired ratio $V_F/V_I$. For example, where the leading edge velocity $V_I$ is approximately equal to the centerline velocity $V_C$ and the centerline velocity $V_C$ is approximately 1.3 times the flow front velocity $V_F$, the ratio $V_F/V_I$ is about 1 divided by 1.3, or about 0.769. Increasing the offset of the interior layer from the flow centerline generally decreases the leading edge velocity $V_I$ and therefore generally increases the ratio $V_F/V_I$.

Figure 19:
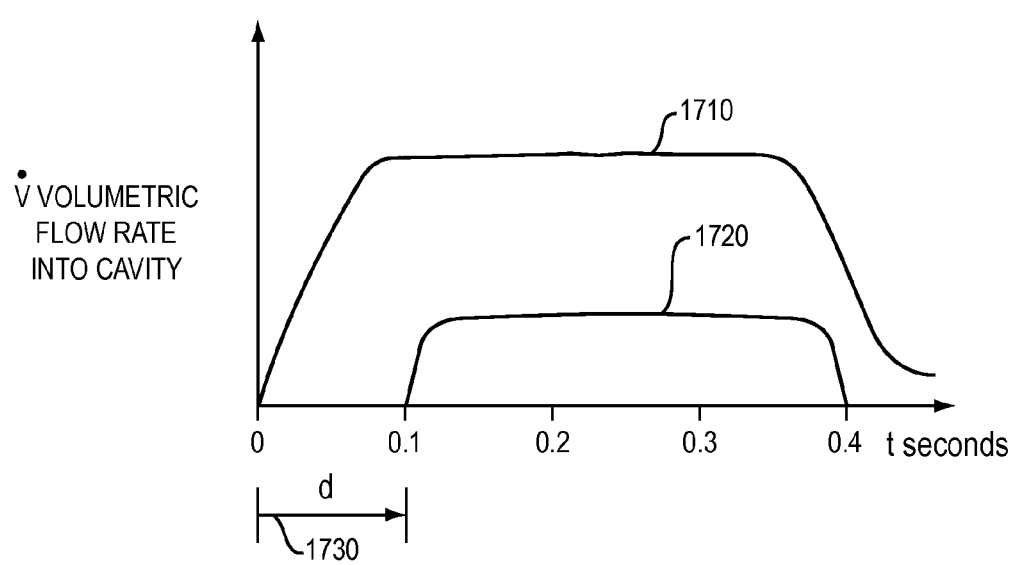
FIG. 19 is diagram plotting an exemplary volumetric rate of flow of polymeric material into a mold cavity versus time.

FIG. 19 illustrates an exemplary plot of the volumetric flow of a polymeric stream into a mold cavity over time. The horizontal axis of FIG. 19 represents time, and the vertical axis of FIG. 19 represents the volumetric material flow rate. The time line of FIG. 19 begins with the flow of polymer into the mold cavity. Curve 1710 illustrates the volumetric flow rate of the sum of the inner and outer layer polymer. The flow initially increases quickly, as illustrated by curve 1710. The inner and outer layer polymer forms the inner and outer layers of a molded article. In FIG. 19, an interior layer polymer is added to the flow into the mold cavity after 0.1 second as illustrated by curve 1720. The interior layer polymer forms the interior layer of the molded article. The delay between the initial flow of the inner and outer layer polymer and the initial flow of the interior layer polymer is designated as time delay d 1730. The time delay d differs in various embodiments taught herein.

Returning to FIG. 18B, we again note that FIG. 18B illustrates the interior layer leading edge 150c in combined flow 300. As in FIGS. 6A-B, the distance between the combined flow front 330 and the cavity periphery 250 is designated in FIG. 18B as the flow distance 370 ($L_F$). Also as in FIGS. 6A-B, the greater distance between the interior layer leading edge 150c and the cavity periphery 250 is designated in FIG. 18B as the flow distance 380 ($L_I$). The ratio of distance 370 over distance 380 ($L_F/L_I$) is determined by the time delay d in adding the interior layer material to the polymeric stream injected into the mold cavity.

If the flow boundary is uniform in all cavities of a molding system, then a time delay d of approximately 0.1 second enables the interior layer leading edge to flow proximate to the periphery of the molded part in all cavities. For the example described above with respect to FIG. 18B, in which the ratio $V_F/V_I$ is about 0.769, the ratio of distance 370 over distance 380 ($L_F/L_I$) is the "ideal" proportion for the given interior layer offset when time delay d 1730 is approximately 0.1 second and the time for the flow front to reach the part periphery is slightly less than 0.4 second as illustrated in FIG. 19—that is the ratio of distance 370 over the flow front velocity is equal to the ratio of distance 380 over the leading edge velocity (i.e., ($L_F/V_F$)=($L_I/V_I$)). Stated an another way, the velocity of the leading edge of the interior layer is equal to the product of the velocity of the combined flow front multiplied by the quotient of the flow distance from the leading edge of the interior layer to the periphery of the mold divided by the flow distance from the combined flow front to the periphery of the mold (i.e., $V_I=V_F*(L_I/L_F)$). In the ideal case, the flow front of the combined flow reaches the periphery of the mold cavity just as the leading edge of the interior layer becomes proximate to the flow front.

If the flow boundary is not uniformly the same in any one cavity as illustrated in FIG. 18C or between cavities in a multi-cavity molding system, then setting a time delay d to less than 0.1 second creates foldover in the portion(s) of the molded part(s) in which the ratio $L_F/L_I$ is larger than the "ideal" proportion. The ratio of distance 370 over distance 380 ($L_F/L_I$) is larger if the time delay d is less than 0.1 second. When the ratio $L_F/L_I$ is larger, the flow front 300 reaches the periphery 250 after the leading edge of the interior layer 150c becomes proximate to the flow front 330 and folds over. In sum, the larger ratio $L_F/L_I$, which can be caused by a smaller time delay d, makes fold over more likely to occur. As described, a flow boundary that is not symmetrical may be made to be a non-uniform symmetrical flow boundary by appropriately decreasing time delay d.

On the other hand, setting a time delay d to greater than 0.1 second decreases the ratio of distance 370 over distance 380 ($L_F/L_I$). When the ratio $L_F/L_I$ is smaller, the flow front 300 reaches the periphery 250 before the leading edge of the interior layer 150*c* becomes proximate to the flow front 330—potentially leaving an undesirable gap in the coverage of the interior layer 150 within in the resulting molded article.

Figure 20A:
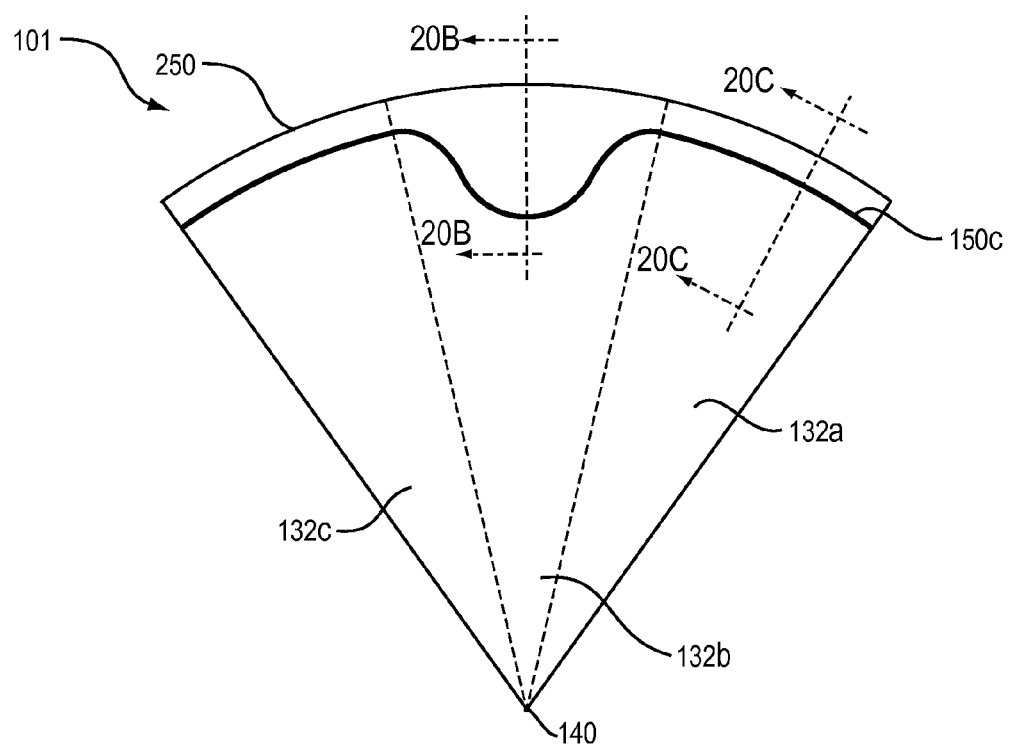
FIG. 20A is an illustrative view of a portion of a molded part, which corresponds to the portion of the mold cavity illustrated in FIG. 18.
Figure 20B:
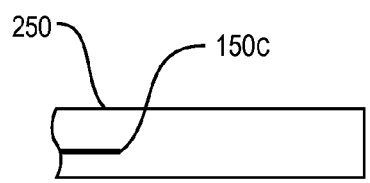
FIGS. 20B and 20C are cross-sectional views of the indicated portions of the molded part of FIG. 20A.
Figure 20C:
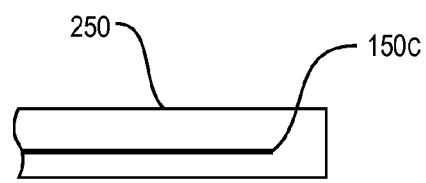
Figure 21A:
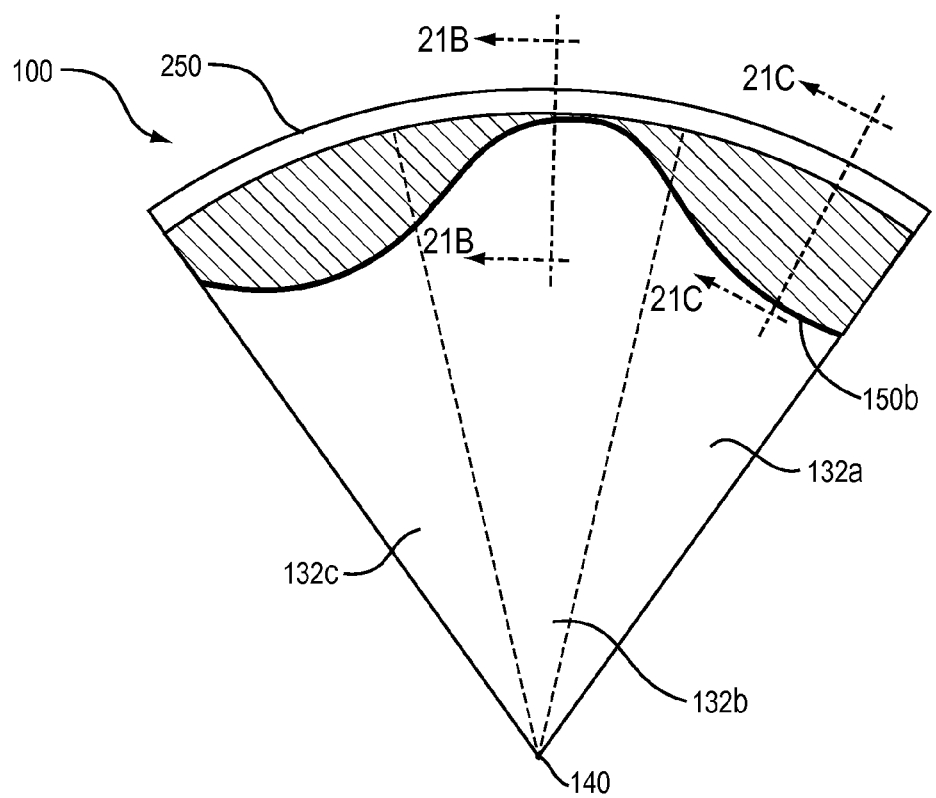
FIG. 21A is an illustrative view of a portion of a molded part, which corresponds to the portion of the mold cavity illustrated in FIG. 18, in accordance with embodiments taught herein.

FIGS. 20A-C and FIGS. 21A-C illustrate the same portion of alternative molded parts that may result from different flow conditions in the mold cavity illustrated in FIGS. 18A and 18C. The periphery of the molded parts in FIGS. 20 and 21 correspond to the periphery 250 of the mold cavity in FIGS. 18A-C; accordingly, the periphery of the molded parts are similarly designated 250. The material injection location of the molded parts in FIGS. 20A and 21A similarly correspond to the injection location 140 of the mold cavity in FIGS. 18A and 18C; accordingly, the injection location of the molded parts are similarly designated 140. FIGS. 20A and 21A are each divided into three segments 132*a*, 132*b*, 132*c*, which correspond to the combined flow segments 300*a*, 300*b*, and 300*c* of FIG. 18A, respectively.

FIGS. 20A-C illustrate the leading edge 150*c* of the interior layer in a portion of a molded part 101 created with a time delay d of approximately 0.1 second. The flow boundary created in the production of molded part 101, however, is not uniformly the same in any one cavity or between cavities of the molding system. Thus, the leading edge 150*c* of the interior layer in FIG. 20A is much farther from the periphery 250 in segment 132*b* than in segments 132*a* and 132*c*. FIG. 20B illustrates a cross-sectional view of segment 132*b* of FIG. 20A. FIG. 20C illustrates a cross-sectional view of segment 132*a* of FIG. 20A. A cross-sectional view of segment 132*c* of FIG. 20A would be similar to FIG. 20C, and different than FIG. 20B. A comparison of the distance between the leading edge 150*c* and the periphery 250 in FIG. 20B to the corresponding distance in FIG. 20C confirms that the leading edge 150*c* is much farther from the periphery 250 in segment 132*b* than in segments 132*a* (or 132*c*).

Figure 21B:
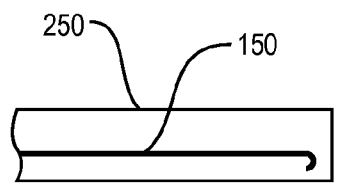
FIGS. 21B and 21C are cross-sectional views of the indicated portions of the molded part of FIG. 21A, in accordance with embodiments taught herein.
Figure 21C:
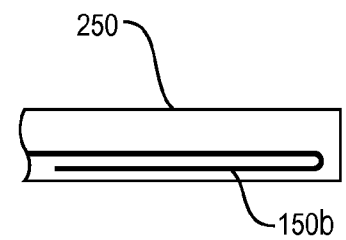

FIGS. 21A-C illustrate the interior layer 150 in a portion of a molded part 100 produced in the same molding system as FIGS. 20A-C, but with a time delay d of less than 0.1 second sufficiently to produce a non-uniform symmetrical flow boundary. Unlike the interior layer in segment 132*b* of FIG. 20A, the interior layer 150 in segment 132*b* of FIG. 21A is proximate to the periphery of the molded part. As in FIG. 20A, the interior layer leading edge 150*c* in segment 132*b* lagged behind the leading edges 150*c* in segments 132*a* and 132*c* during the production of FIG. 21A's molded part 100. The advanced portions of the interior layer leading edge 150*c* became proximate to flow front 330 earlier, however, and folded over to create foldover portions 150*b* in segments 132*a* and 132*c*.

FIG. 21B illustrates a cross-sectional view of segment 132*b* of FIG. 21A. FIG. 21B illustrates the interior layer 150 having a small foldover portion 150*b* in segment 132*b*. Other embodiments taught herein, however, include no foldover portion of the interior layer 150 in the lagging segment. FIG. 21C illustrates a cross-sectional view of segment 132*a* of FIG. 21A. A cross-sectional view of segment 132*c* of FIG. 21A would be similar to FIG. 21C, but different than FIG. 21B. FIG. 21C illustrates a segment of molded part 100 in which the interior layer leading edge 150*c* reached the flow front 330 and created a foldover portion 150*b* during production large enough to allow the lagging portion of leading edge 150*c* in segment 132*b* to become proximate to the periphery.

FIGS. 21A-C illustrate the effect of adjusting the time delay to create foldover when it is necessary to use foldover to correct for imperfect flow.

FIGS. 21A-C further illustrate some embodiments in which a time delay adjustment is used in conjunction with a flow leader to create a symmetrical flow boundary that will provide the desired coverage of the interior layer in the resulting molded product. One skilled in the art knows it is difficult to create a perfect flow leader for many non-symmetric molded parts, and can appreciate that techniques may be used to achieve the necessary coverage of the interior layer.

Figure 22:
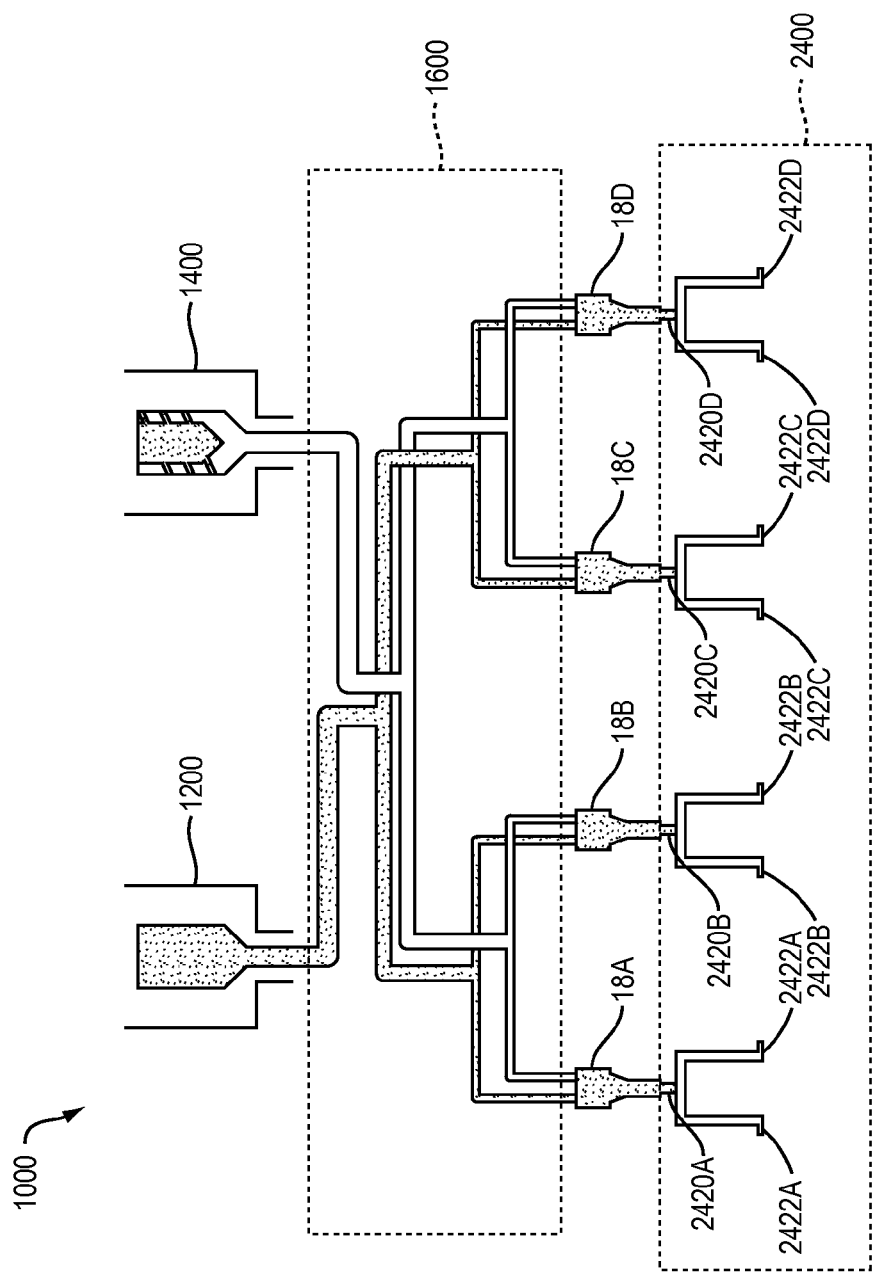
FIG. 22 depicts a cross-sectional view of an exemplary molding system according to various embodiments taught herein.

FIG. 22 illustrates an exemplary system suitable for practicing exemplary embodiments. Co-injection molding system 1000 is configured to inject at least two materials into a mold cavity. Materials suitable for use include all materials previously discussed. Co-injection molding system 1000 includes a first material source 1200, a second material source 1400, and a manifold 1600. Manifold 1600 may consist of separate manifolds for each polymeric material. Co-injection molding system 1000 further includes nozzle assemblies 18A, 18B, 18C, 18D and mold 2400. Mold 2400 includes gates 2420A, 2420B, 2420C, 2420D, and cavities 2422A, 2422B, 2422C, 2422D. In FIG. 22, each nozzle assembly 18 corresponds to a gate 2420 and a cavity 2422. For example, nozzle assembly 18A corresponds to gate 2420A and cavity 2422A. One of skill in the art will understand that although four mold cavities are illustrated in FIG. 22, mold 2400 may include a different number of mold cavities. For example, mold 2400 may include any number of mold cavities up to 64 or more mold cavities. In one embodiment, each cavity in mold 2400 forms a separate molded article.

A first polymeric material is extruded from the first material source 1200 and a second polymeric material is extruded from the second material source 1400 into the manifold 1600 for combining in nozzles 18A, 18B, 18C, 18D before being injected into mold cavities 2422A, 2422B, 2422C, 2422D. The first and second polymeric streams are combined to form an annular combined polymeric stream such that the first polymeric material forms an interior core stream in the combined polymeric stream while the second polymeric material forms the inner and outer streams in the combined stream. The inner and outer streams encase the interior core stream as the annular combined polymeric stream is injected from the nozzle.

In alternative embodiment (not shown), molding system 1000 is configured to form a plurality of open containers that are connected to each other. In this embodiment, mold 2400 is configured to form a molded article comprising a plurality of open containers. For example, the molded article may include 4, 6, 8, or more open containers. In such an embodiment, there need not be a nozzle assembly or injection gate dedicated to forming each container. Instead, a single nozzle assembly and injection gate may form a plurality of connected molded containers. The connected containers may be used as a plurality of connected containers. Alternatively, the connected containers may be separated and then used.

FIG. 23 illustrates an exemplary computing environment suitable for practicing exemplary embodiments taught herein. The environment may include a co-injection control device 900 coupled, wired, wirelessly or a hybrid of wired and wirelessly, to co-injection system 1000. The co-injection control device 900 is programmable to implement executable Barrier Coverage Code 950 for forming a barrier layer or scavenger layer that provides coverage over a range of between 95% and 100%, or even between 99% and 100%, of a sealed or sealable portion of non-symmetric container or a sealable portion of a non-symmetric cap surface area as taught herein. Co-injection control device 900 includes one or more computer-readable media for storing one or more computer-executable instructions or software for implementing exemplary embodiments. The computer-readable media may include, but are not limited to, one or more types of hardware memory, non-transitory tangible media, etc. For example, memory 906 included in the co-injection control device 900 may store computer-executable instructions or software, e.g., instructions for implementing and executing the executable Barrier Coverage Code 950. Co-injection control device 900 also includes processor 902 and, one or more processor(s) 902' for executing software stored in the memory 906, and other programs for controlling system hardware. Processor 902 and processor(s) 902' each can be a single core processor or multiple core (904 and 904') processor.

Virtualization may be employed in co-injection control device 900 so that infrastructure and resources in the computing device can be shared dynamically. Virtualized processors may also be used with the executable Barrier Coverage Code 950 and other software in storage 916. A virtual machine 914 may be provided to handle a process running on multiple processors so that the process appears to be using only one computing resource rather than multiple. Multiple virtual machines can also be used with one processor.

Memory 906 may comprise a computer system memory or random access memory, such as DRAM, SRAM, EDO RAM, etc. Memory 906 may comprise other types of memory as well, or combinations thereof.

A user may interact with co-injection control device 900 through a visual display device 922, such as a computer monitor, which may display the user interfaces 924 or any other interface. The visual display device 922 may also display other aspects or elements of exemplary embodiments, e.g. the databases, etc. Co-injection control device 900 may include other I/O devices such a keyboard or a multiple point touch interface 908 and a pointing device 910, for example a mouse, for receiving input from a user. The keyboard 908 and the pointing device 910 may be connected to the visual display device 922. Co-injection control device 900 may include other suitable conventional I/O peripherals. Co-injection control device 900 may further comprise a storage device 916, such as a hard-drive, CD-ROM, or other non-transitory computer readable media, for storing an operating system 918 and other related software, and for storing executable Barrier Coverage Code 950.

Co-injection control device 900 may include a network interface 912 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 912 may comprise a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 900 may be any computer system such as a workstation, desktop computer, server, laptop, handheld computer or other form of computing or telecommunications device that is capable of communication and that has sufficient processor power and memory capacity to perform the operations described herein.

Co-injection control device 900 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Barrier Coverage Code 950 includes executable code executable by the processor 902 to control the co-injection system 1000 to selectively control a volumetric flow volume of the inner and outer polymeric streams, control a position of the interior core material stream 150a relative to a velocity flow front of the combined polymeric stream and control extrusion start time of the interior core stream relative to the extrusion start time of the inner and outer polymeric streams as taught herein. That is, Barrier Coverage Code 950 includes executable code executable by the processor 902 to control the co-injection system 1000 to place the interior core material flow stream 150a on a flow streamline that has a velocity that is greater that the average velocity of the combined annular flow 300. Thus, the interior layer material flow 150a can "catch up" to the fountain flow and fold over, creating coverage of a barrier layer or scavenger layer in the resulting molded article in a range of between 99% and 100% coverage in a sealable or sealed area of the article. Execution of the Barrier Coverage Code 950 by the processor 902 allows the co-injection system 1000 to place the interior layer material flow 150a either inside or outside the location of the zero-velocity gradient creating fold over toward the inside or outside of the resulting article, respectively. Methods and co-injection systems taught herein facilitate the co-injection molding of non-symmetrical food or beverage containers whereby the interior layer extends between 99% and 100% of a sealable or sealed area formed by the walls, flange and closed end of the resulting molded container. The sealable or sealed area is defined by an interior portion of the resulting molded article that extends to a surface of a sealing area 120, which may be located in a flange portion of the resulting molded article.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense.

Although the claims recite specific combinations of limitations, the invention expressly encompasses each independent claim by itself and also in conjunction with any possible combination of limitations articulated in the related dependent claims except those that are clearly incompatible.

What is claimed is:

1. A mold for molding an injection molded article, the mold comprising a mold cavity comprising at least one flow leader in a non-symmetrical portion of the mold cavity that produces a symmetrical flow boundary in a multilayer flow downstream of the non symmetrical portion, wherein the multilayer flow comprises an inner layer, an outer layer, and an interior layer.

2. The mold of claim 1 further comprising at least one injection gate configured for injection of molding material into the at least one flow leader and wherein the nonsymmetric portion of the mold cavity is nonsymmetric with respect to the at least one injection gate.

3. The mold of claim 2 wherein the at least one injection gate is located adjacent to the nonsymmetric portion of the mold cavity.

4. The mold of claim 2 wherein the at least one injection gate is remote from the nonsymmetric portion of the mold cavity.

5. The mold of claim 1 wherein the at least one flow leader is selected from a group consisting of a variable thickness flow leader and a plurality of flow leaders each having a flow path length that differs from the flow path length of any adjacent flow leader by no greater than about 15%.

6. The mold of claim 5 wherein the at least one flow leader comprises a plurality of flow leaders each having a flow path length that differs from the flow path length of any adjacent flow leader by no greater than about 10%.

7. The mold of claim 6 wherein the at least one flow leader comprises a plurality of flow leaders each having a flow path length that differs from the flow path length of any adjacent flow leader by no greater than about 5%.

8. The mold of claim 1 wherein the at least one flow leader is configured to produce a flow boundary downstream of which the velocity of the combined flow of molding material, injected through the at least one injection gate into the at least one flow leader, is effectively perpendicular to the periphery of the mold cavity so that the velocity vector of the combined flow has no significant tangential component.

9. The mold of claim 1 wherein the at least one flow leader comprises a variable thickness flow leader configured so that the velocity of the leading edge of the interior layer exiting the distal end of the at least one flow leader is substantially equal to the product of the velocity of the combined flow front multiplied by the quotient of the flow distance from the leading edge of the interior layer to the periphery of the mold divided by the flow distance from the combined flow front to the periphery of the mold.

10. The mold of claim 1 wherein the at least one flow leader comprises a variable thickness flow leader configured so that the velocity of the leading edge of the interior layer exiting the distal end of the at least one flow leader is greater than the product of the velocity of the combined flow front multiplied by the quotient of the flow distance from the leading edge of the interior layer to the periphery of the mold divided by the flow distance from the combined flow front to the periphery of the mold.

11. The mold of claim 1 wherein the at least one flow leader comprises a plurality of flow leaders configured so that the velocity of the leading edge of the interior layer exiting the distal ends of the plurality of flow leaders is substantially equal to the product of the velocity of the combined flow front multiplied by the quotient of the flow distance from the leading edge of the interior layer to the periphery of the mold divided by the flow distance from the combined flow front to the periphery of the mold.

12. The mold of claim 1 wherein the at least one flow leader comprises a plurality of flow leaders configured so that the velocity of the leading edge of the interior layer exiting the distal ends of the plurality of flow leaders is greater than the product of the velocity of the combined flow front multiplied by the quotient of the flow distance from the leading edge of the interior layer to the periphery of the mold divided by the flow distance from the combined flow front to the periphery of the mold.

13. A co-injection molding apparatus comprising:
(a) a mold defining a mold cavity comprising at least one flow leader in a non-symmetrical portion of the mold cavity; and (b) a first injection gate configured for co-injection of at least one first and second flowable materials into the mold cavity and through the at least one flow leader to form a molded article comprising the first and second flowable materials, wherein the second flowable material is interior to the first flowable material,
wherein the at least one flow leader is configured to produce a symmetrical flow boundary in the first and second flowable materials downstream of the non-symmetrical portion.

14. The co-injection molding apparatus of claim 13 wherein the at least one injection gate is located adjacent to the nonsymmetric portion of the mold cavity.

15. The co-injection molding apparatus of claim 13 wherein the at least one injection gate is remote from the nonsymmetric portion of the mold cavity.

16. The co-injection molding apparatus of claim 13 wherein the at least one flow leader is selected from a group consisting of a variable thickness flow leader and a plurality of flow leaders each having a flow path length that differs from the flow path length of any adjacent flow leader by no greater than about 15%.

17. The co-injection molding apparatus of claim 16 wherein the at least one flow leader comprises a plurality of flow leaders each having a flow path length that differs from the flow path length of any adjacent flow leader by no greater than about 10%.

18. The co-injection molding apparatus of claim 17 wherein the at least one flow leader comprises a plurality of flow leaders each having a flow path length that differs from the flow path length of any adjacent flow leader by no greater than about 5%.

19. The co-injection molding apparatus of claim 1$ wherein the at least one flow leader is configured to produce a flow boundary downstream of which the velocity of the combined flow of molding material, injected through the at least one injection gate into the at least one flow leader, is effectively perpendicular to the periphery of the mold cavity so that the velocity vector of the combined flow has no significant tangential component.

20. The co-injection molding apparatus of claim 13 wherein the at least one flow leader comprises a variable thickness flow leader configured so that the velocity of the leading edge of the interior layer exiting the distal end of the at least one flow leader is substantially equal to the product of the velocity of the combined flow front multiplied by the quotient of the flow distance from the leading edge of the interior layer to the periphery of the mold divided by the flow distance from the combined flow front to the periphery of the mold.

21. The co-injection molding apparatus of claim 13 wherein the at least one flow leader comprises a variable thickness flow leader configured so that the velocity of the leading edge of the interior layer exiting the distal end of the at least one flow leader is greater than the product of the velocity of the combined flow front multiplied by the quotient of the flow distance from the leading edge of the interior layer to the periphery of the mold divided by the flow distance from the combined flow front to the periphery of the mold.

22. The co-injection molding apparatus of claim 13 wherein the at least one flow leader comprises a plurality of flow leaders configured so that the velocity of the leading edge of the interior layer exiting the distal ends of the plurality of flow leaders is substantially equal to the product of the velocity of the combined flow front multiplied by the quotient of the flow distance from the leading edge of the interior layer to the periphery of the mold divided by the flow distance from the combined flow front to the periphery of the mold.

23. The co-injection molding apparatus of claim 13 wherein the at least one flow leader comprises a plurality of flow leaders configured so that the velocity of the leading edge of the interior layer exiting the distal ends of the plurality of flow leaders is greater than the product of the velocity of the combined flow front multiplied by the quotient of the flow distance from the leading edge of the interior layer to the periphery of the mold divided by the flow distance from the combined flow front to the periphery of the mold.

24. The co-injection molding apparatus of claim 13 wherein the first injection gate is configured to receive co-injected first and second flowable materials therethrough.

25. The co-injection molding apparatus of claim 13 further comprising a second injection gate offset from the first injection gate.

26. The co-injection molding apparatus of claim 13 further comprising a controller that delays the injection of the at least one second flowable material into the mold cavity by the first injection gate after the initial injection of the at least one first flowable material by a period of time calculated to cause the at least one second flowable material to flow throughout substantially the entire mold cavity.

27. The co-injection molding apparatus of claim 13 further comprising:
(a) an apparatus defining a plurality of mold cavities, each mold cavity comprising at least one flow leader in a non-symmetrical portion thereof and configured to form a molded article; and
(b) a first injection gate configured for co-injection of at least one first and second flowable materials into the apparatus and through the flow leaders to form a plurality of molded articles each comprising the first and second flowable materials, wherein the second flowable material is interior to the first flowable material,
wherein the flow leader in each mold cavity is configured to produce a symmetrical flow boundary in the first and second flowable materials downstream of the non-symmetrical portion of the mold cavity.

28. The co-injection molding apparatus of claim 27 wherein the apparatus defines 64 mold cavities.

29. The co-injection molding apparatus of claim 2$ wherein the apparatus defines more than 64 mold cavities.

30. A co-injection molding apparatus comprising:
(a) a plurality of injection gates;
(b) a mold defining a mold cavity configured to form a molded article comprising a plurality of open containers,
the mold cavity comprising a non-symmetrical portion that is non-symmetrical with respect to the plurality of injection gates and at least one flow leader in the non-symmetrical portion; and
wherein the plurality of injection gates are configured for co-injection of a first flowable material and a second flowable material into the mold cavity and through the at least one flow leader to form the molded article with the first and second flowable materials,
wherein the second flowable material is interior to the first flowable material,
wherein the at least one flow leader is configured to produce a symmetrical flow boundary in the first and second flowable materials downstream of the non-symmetrical portion.

31. The co-injection molding apparatus of claim 30 wherein the plurality of open containers comprise 32 open containers.

32. The co-injection molding apparatus of claim 31 wherein the plurality of open containers comprise 64 open containers.

33. The co-injection molding apparatus of claim 30 wherein the at least one flow leader comprises a plurality of flow leaders each having a flow path length that differs from the flow path length of any adjacent flow leader by no greater than about 15%.

34. The co-injection molding apparatus of claim 33 wherein the at least one flow leader comprises a plurality of flow leaders each having a flow path length that differs from the flow path length of any adjacent flow leader by no greater than about 10%.

35. The co-injection molding apparatus of claim 34 wherein the at least one flow leader comprises a plurality of flow leaders each having a flow path length that differs from the flow path length of any adjacent flow leader by no greater than about 5%.

36. The co-injection molding apparatus of claim 30 wherein the at least one flow leader comprises a plurality of flow leaders configured so that the velocity of the leading edge of the interior layer exiting the distal ends of the plurality of flow leaders is substantially equal to the product of the velocity of the combined flow front multiplied by the quotient of the flow distance from the leading edge of the interior layer to the periphery of the mold divided by the flow distance from the combined flow front to the periphery of the mold.

37. The co-injection molding apparatus of claim 30 wherein the at least one flow leader comprises a plurality of flow leaders configured so that the velocity of the leading edge of the interior layer exiting the distal ends of the plurality of flow leaders is greater than the product of the velocity of the combined flow front multiplied by the quotient of the flow distance from the leading edge of the interior layer to the periphery of the mold divided by the flow distance from the combined flow front to the periphery of the mold.

38. The co-injection molding apparatus of claim 30 wherein the at least one flow leader comprises a variable thickness flow leader featuring a smooth transition from a first thickness to a second thickness.

39. The co-injection molding apparatus of claim 30 wherein the at least one flow leader comprises a variable thickness flow leader configured so that the velocity of the leading edge of the interior layer exiting the distal end of the variable thickness flow leader is substantially equal to the product of the velocity of the combined flow front multiplied by the quotient of the flow distance from the leading edge of the interior layer to the periphery of the mold divided by the flow distance from the combined flow front to the periphery of the mold.

40. The co-injection molding apparatus of claim 30 wherein the at least one flow leader comprises a variable thickness flow leader configured so that the velocity of the leading edge of the interior layer exiting the distal end of the variable thickness flow leader is greater than the product of the velocity of the combined flow front multiplied by the quotient of the flow distance from the leading edge of the interior layer to the periphery of the mold divided by the flow distance from the combined flow front to the periphery of the mold.

41. The co-injection molding apparatus of claim 30 wherein the at least one flow leader is configured to produce a flow boundary downstream of which the velocity of the combined flow of molding material, injected through the at least one injection gate into the at least one flow leader, is effectively perpendicular to the periphery of the mold cavity so that the velocity vector of the combined flow has no significant tangential component.

42. The co-injection molding apparatus of claim 30 further comprising a controller that delays the injection of the at least one second flowable material into the mold cavity by the first injection gate after the initial injection of the at least one first flowable material by a period of time calculated to cause the at least one second flowable material to flow throughout substantially the entire mold cavity.

* * * * *